United States Patent
Geng

(10) Patent No.: US 9,337,483 B2
(45) Date of Patent: May 10, 2016

(54) PASTED NICKEL HYDROXIDE ELECTRODE AND ADDITIVES FOR RECHARGEABLE ALKALINE BATTERIES

(71) Applicant: PowerGenix Systems, Inc., La Jolla, CA (US)

(72) Inventor: Mingming Geng, Middleton, WI (US)

(73) Assignee: PowerGenix Systems, Inc., San Diego, CA (US)

( * ) Notice: Subject to any disclaimer, the term of this patent is extended or adjusted under 35 U.S.C. 154(b) by 187 days.

(21) Appl. No.: 14/150,456

(22) Filed: Jan. 8, 2014

(65) Prior Publication Data

US 2014/0199591 A1 Jul. 17, 2014

Related U.S. Application Data

(60) Provisional application No. 61/752,162, filed on Jan. 14, 2013.

(51) Int. Cl.
*H01M 4/00* (2006.01)
*H01M 4/13* (2010.01)
(Continued)

(52) U.S. Cl.
CPC ............... *H01M 4/366* (2013.01); *H01M 4/32* (2013.01); *H01M 4/52* (2013.01); *H01M 10/24* (2013.01); *H01M 10/30* (2013.01); *H01M 10/345* (2013.01); *Y02E 60/122* (2013.01)

(58) Field of Classification Search
USPC ................... 429/223, 218.1, 231.1
IPC ....................... H01M 4/00, 4/13, 4/58
See application file for complete search history.

(56) References Cited

U.S. PATENT DOCUMENTS

| 3,647,544 A | 3/1972 | Schneider |
| 3,870,564 A | 3/1975 | Takamura et al. |

(Continued)

FOREIGN PATENT DOCUMENTS

| CN | 1234622 A | 11/1999 |
| CN | 1339844 A | 3/2002 |

(Continued)

OTHER PUBLICATIONS

International Preliminary Report on Patentability dated Aug. 10, 2010 for PCT Application No. PCT/US2009/033265.

(Continued)

*Primary Examiner* — Patrick Ryan
*Assistant Examiner* — Julian Anthony
(74) *Attorney, Agent, or Firm* — Weaver Austin Villeneuve & Sampson LLP

(57) ABSTRACT

A pasted positive nickel hydroxide electrode for use in battery cells (e.g., in nickel zinc cells, and nickel metal hydride cells) includes nickel hydroxide particles, a cobalt metal and/or cobalt compound and a sulfur-containing complexing agent capable of forming a complex with cobalt. The presence of the sulfur-containing complexing agent, such as dialkyldithiocarbamate (e.g., sodium diethyldithiocarbamate) improves lifetime and capacity utilization of the nickel electrode. The resulting pasted nickel hydroxide electrode includes a CoOOH conductive matrix after formation. The surface of the nickel hydroxide particles in the electrode is modified in some embodiments by providing a cobalt-containing coating onto the surface of the nickel hydroxide particles, followed by oxidation with a strong oxidizing agent. The complexing agent can be added before, after, or during the oxidation.

21 Claims, 13 Drawing Sheets

(51) Int. Cl.
  *H01M 4/58* (2010.01)
  *H01M 4/36* (2006.01)
  *H01M 4/52* (2010.01)
  *H01M 10/24* (2006.01)
  *H01M 10/30* (2006.01)
  *H01M 4/32* (2006.01)
  *H01M 10/34* (2006.01)

(56) References Cited

U.S. PATENT DOCUMENTS

| | | | |
|---|---|---|---|
| 3,951,687 | A | 4/1976 | Takamura et al. |
| 3,961,985 | A | 6/1976 | Takamura et al. |
| 4,003,754 | A | 1/1977 | Winsel et al. |
| 4,017,665 | A | 4/1977 | Sandera et al. |
| 4,939,194 | A | 7/1990 | Scott et al. |
| 5,215,836 | A | 6/1993 | Eisenberg |
| 5,523,182 | A | 6/1996 | Ovshinsky et al. |
| 5,804,334 | A | 9/1998 | Yamamura |
| 5,968,684 | A | 10/1999 | Hayashi et al. |
| 6,040,007 | A | 3/2000 | Junichi et al. |
| 6,221,528 | B1 * | 4/2001 | Ouchi ............... H01M 4/044 29/623.5 |
| 6,225,004 | B1 | 5/2001 | Hayashi |
| 6,258,483 | B1 | 7/2001 | Abe |
| 6,436,575 | B1 | 8/2002 | Weckesser et al. |
| 6,455,196 | B1 | 9/2002 | Kato et al. |
| 6,617,072 | B2 | 9/2003 | Venkatesan et al. |
| 6,649,305 | B1 | 11/2003 | Bugnet et al. |
| 6,787,265 | B2 | 9/2004 | Philips |
| 7,261,972 | B2 | 8/2007 | Inada et al. |
| 7,829,221 | B2 | 11/2010 | Phillips |
| 8,043,748 | B2 | 10/2011 | Geng et al. |
| 8,048,566 | B2 | 11/2011 | Geng et al. |
| 2001/0033966 | A1 | 10/2001 | Tanigawa et al. |
| 2001/0051299 | A1 | 12/2001 | Yano et al. |
| 2002/0024041 | A1 | 2/2002 | Tanigawa et al. |
| 2002/0037455 | A1 | 3/2002 | Tani et al. |
| 2002/0172758 | A1 * | 11/2002 | Nanno ............... H01M 4/26 427/126.6 |
| 2003/0140483 | A1 | 7/2003 | Wakabayashi et al. |
| 2004/0053114 | A1 | 3/2004 | Furukawa et al. |
| 2004/0115533 | A1 | 6/2004 | Phillips |
| 2005/0003270 | A1 | 1/2005 | Phillips |
| 2006/0029863 | A1 | 2/2006 | Miyamoto et al. |
| 2008/0182170 | A1 | 7/2008 | Rong et al. |
| 2009/0202904 | A1 | 8/2009 | Geng et al. |
| 2009/0208839 | A1 * | 8/2009 | Geng ............... B82Y 30/00 429/206 |
| 2012/0018669 | A1 | 1/2012 | Geng et al. |
| 2012/0018670 | A1 | 1/2012 | Geng et al. |

FOREIGN PATENT DOCUMENTS

| | | |
|---|---|---|
| CN | 1444300 A | 9/2003 |
| CN | 1460645 A | 12/2003 |
| CN | 1462079 A | 12/2003 |
| CN | 1552110 A | 12/2004 |
| CN | 1627551 A | 6/2005 |
| CN | 101320805 | 12/2008 |
| CN | 101459241 A1 | 6/2009 |
| EP | 0833397 | 4/1976 |
| EP | 0457354 | 11/1991 |
| EP | 0697746 | 2/1996 |
| EP | 0902490 | 3/1999 |
| EP | 1172869 | 1/2002 |
| EP | 1207576 | 5/2002 |
| EP | 1367666 | 12/2003 |
| EP | 1699099 | 9/2006 |
| EP | 1168471 | 1/2011 |
| JP | S54-163324 | 12/1979 |
| JP | S56-29345 | 7/1981 |
| JP | 07-037609 | 2/1995 |
| JP | H10-012236 A | 1/1998 |
| JP | H10-255781 A | 9/1998 |
| JP | 11-297352 | 10/1999 |
| JP | 2000-003707 A | 1/2000 |
| JP | 2000-058062 A | 2/2000 |
| JP | 2001-357845 A | 12/2001 |
| JP | 2002/175811 A | 6/2002 |
| JP | 2002-198046 A | 7/2002 |
| JP | WO02/071527 | 9/2002 |
| JP | 2003-077468 A | 3/2003 |
| JP | 2003-077469 A | 3/2003 |
| JP | 2003-157840 A | 5/2003 |
| JP | 2003-303590 A | 10/2003 |
| JP | 2004-006092 A | 1/2004 |
| JP | 2004-513501 A | 4/2004 |
| JP | 2005-019349 A | 1/2005 |
| JP | 2005-056733 | 3/2005 |
| JP | 2007-066697 A | 3/2007 |
| JP | 2007-214125 A | 8/2007 |
| JP | 2007-335154 A | 12/2007 |
| JP | 2008-532249 A | 8/2008 |
| WO | WO02/39534 | 5/2002 |
| WO | WO2009/100248 | 8/2009 |
| WO | WO2010/127153 | 11/2010 |

OTHER PUBLICATIONS

International Search Report and Written Opinion dated May 9, 2014, for PCT Application PCT/US2014/010725.
CN Office Action dated Feb. 12, 2014 in Application No. 200980104394.2.
CN Office Action dated Jul. 2, 2014 in Application No. 200980104394.2.
CN Office Action dated Jun. 26, 2014 in Application No. 201080018691.8.
CN Office Action dated Mar. 9, 2015 in Application No. 201080018691.8.
JP Office Action dated Dec. 24, 2013 in JP Application No. 2010-546004.
JP Decision of Rejection dated Aug. 5, 2014 in JP Application No. 2010-546004.
JP Office Action dated Jan. 14, 2014 in JP Application No. 2012-508746.
JP Office Action dated Jan. 20, 2015 in JP Application No. 2012-508746.
US Final Office Action, dated Apr. 11, 2014, issued in U.S. Appl. No. 13/250,729.
US Final Office Action, dated Apr. 11, 2014, issued in U.S. Appl. No. 13/250,217.
Ohta et al., "Nicel Hydroxide Electrode: Improvement of Charge Efficiency at High Temperature," The Electrochemical Society Proceedings, vol. 94-27, pp. 296-302, 1994.
"WordNet Search." WordNet. Dec. 3, 2008. <http://wordnet.princeton.edu/perl/webwn?s=embedded>.
"WordNet Search." WordNet. Dec. 3, 2008. <http://wordnet.princeton.edu/perl/webwn?s=paste>.
"WordNet Search." WordNet. Apr. 4, 2008. <http://wordnet.princeton.edu>.
Ying et al., "Surface modification of nickel hydroxide particles by micro-sized cobalt oxide hydroxide and properties as electrode materials," *Surface and Coatings Technology*, Elsevier, Amsterdam, NL, vol. 200, No. 7, (Dec. 21, 2005), pp. 2376-2379, XP005181204.
International Search Report mailed Apr. 29, 2002, PCT Application PCT/UCA01/01717.
Search Report and Written Opinion dated May 13, 2009 for PCT Application No. PCT/US2009/033265.
Search Report and Written Opinion dated Jun. 22, 2010 for PCT Application No. PCT/US2010/033023.
International Preliminary Report on Patentability dated Nov. 1, 2011 for PCT Application No. PCT/US2010/033023.
CA Office Action dated Apr. 30, 2008, from CA Appl. No. 2,325,640.
CA Office Action dated Apr. 14, 2009, from CA Appl. No. 2,325,640.
CN Office Action dated Oct. 8, 2012 issued in Application No. 200980104394.2.
CN Office Action dated May 28, 2013 in Application No. 200980104394.2.

(56) References Cited

OTHER PUBLICATIONS

CN Office Action dated Sep. 6, 2013 in Application No. 201080018691.8.
EP Office Action dated Dec. 2, 2009 in EP Appl. No. 01993957.8.
JP Office Action dated Feb. 22, 2008, from JP Appl. No. 2002-541747, with English explanation from Japanese Associate of Office Action.
JP Office Action dated Sep. 8, 2009, from JP Appl. No. 2002-541747, with English explanation from Japanese Associate of Office Action.
US Office Action dated Dec. 10, 2007, from related U.S. Appl. No. 10/899,593.
US Final Office Action dated Apr. 11, 2008, from related U.S. Appl. No. 10/899,593.
US Office Action dated Jun. 30, 2008 in U.S. Appl. No. 10/899,593.
US Office Action dated Dec. 4, 2008, from related U.S. Appl. No. 10/899,593.
Office Action dated Mar. 6, 2009 in U.S. Appl. No. 10/899,593.
US Notice of Allowance dated Nov. 19, 2009, from related U.S. Appl. No. 10/899,593.
US Notice of Allowance dated Feb. 2, 2010, from related U.S. Appl. No. 10/899,593.
US Notice of Allowance dated Jun. 14, 2010, from related U.S. Appl. No. 10/899,593.
US Notice of Allowance dated Sep. 23, 2010 in U.S. Appl. No. 10/899,593.
US Office Action dated Mar. 31, 2011, issued in U.S. Appl. No. 12/365,658.
US Office Action dated Apr. 5, 2011 issued in U.S. Appl. No. 12/432,639.
US Notice of Allowance dated Jul. 22, 2011, issued in U.S. Appl. No. 12/365,658.
US Notice of Allowance dated Aug. 23, 2011, issued in U.S. Appl. No. 12/432,639.
US Office Action, dated Jul. 5, 2012, issued in U.S. Appl. No. 13/250,217.
US Office Action, dated Jul. 5, 2012, issued in U.S. Appl. No. 13/250,729.
US Office Action, dated Nov. 25, 2011, issued in U.S. Appl. No. 13/250,217.
US Office Action, dated Nov. 25, 2011, issued in U.S. Appl. No. 13/250,729.
US Office Action, dated Oct. 2, 2013, issued in U.S. Appl. No. 13/250,729.
US Office Action, dated Oct. 3, 2013, issued in U.S. Appl. No. 13/250,217.
International Preliminary Report on Patentability dated Jul. 23, 2015 for PCT Application PCT/US2014/010725.
CN Notification of Reexamination dated Jul. 23, 2015 in Application No. 200980104394.2.
EP Extended Search Report dated Jul. 16, 2015 for EP Appl. No. 10770358.9.
JP Office Action dated Sep. 1, 2015 in JP Application No. 2012-508746.
KR Office Action dated Jun. 9, 2015 in KR Application No. 2010-546004.
EP Extended Search Report dated Dec. 3, 2015 for EP Appl. No. 14738306.1.

\* cited by examiner

PASTED NICKEL HYDROXIDE ELECTRODE AND ADDITIVES FOR RECHARGEABLE ALKALINE BATTERIES

CROSS REFERENCE TO RELATED APPLICATIONS

This application claims benefit of U.S. Provisional Patent Application No. 61/752,162, filed Jan. 14, 2013, titled "Pasted Nickel Hydroxide Electrode and Additives for Rechargeable Alkaline Batteries" and naming Mingming Geng as the inventor, which is incorporated herein by reference in its entirety and for all purposes.

BACKGROUND

This invention pertains generally to nickel batteries, such as nickel-zinc and nickel-metal hydride batteries. More specifically, this invention pertains to compositions and manufacturing methods for positive nickel electrodes.

Recent economic trends have unmistakably indicated a need for high power and high energy density rechargeable batteries, particularly for applications such as electric vehicles and power tools. Certain aqueous batteries employing a nickel hydroxide electrode may provide suitably high energy density and even high power to meet this need. The nickel hydroxide electrode has been used as the positive electrode in nickel-metal hydride batteries, nickel-cadmium batteries and nickel-zinc batteries. The electrode typically includes nickel hydroxide (including its oxidized form nickel oxyhydroxide), nickel powder and binding materials. Cobalt metal and/or a cobalt compound may be included to increase the conductivity of the nickel electrode. Unfortunately, cobalt can under certain conditions move to the negative electrode where it can promote hydrogen evolution and related difficulties, particularly in the high power nickel-zinc battery.

As demands for higher power and energy density escalate, the composition and associated manufacturing methods of nickel hydroxide electrodes become ever more significant.

SUMMARY OF THE INVENTION

An improved composition for a positive pasted nickel electrode and a method of making a positive pasted nickel electrode are provided. The composition may be used to stabilize the pasted nickel electrode during storage, to prevent peeling off of particles at the nickel electrode surface and to minimize the cobalt migration into the negative (e.g., zinc) electrode. The composition may also be used to decrease nickel electrode swelling during cycling of a rechargeable cell and to improve the nickel electrode capacity utilization for higher density nickel electrode.

High-rate charge acceptance of the pasted nickel hydroxide can be improved through one or more of: (a) addition of a complexing agent (e.g., sodium diethyldithiocarbamate (NaDDC)) to the pasted nickel electrode; (b) surface modification of nickel hydroxide particles, and (c) high-temperature charge formation. The surface modification technology in the pasted nickel electrode improves the high-rate charge acceptance, high-rate discharge capability, over-charge capabilities and long cycling lifetime for the rechargeable alkaline batteries. The nickel hydroxide particles for a nickel hydroxide electrode may be treated using an alkaline solution of a strong oxidizing agent such as sodium or potassium persulfate to modify the surface nickel hydroxide structure. The resulting modified surface structure has been found to impart various benefits to electrodes formed from the nickel hydroxide. The addition of a complexing agent to the pasted nickel hydroxide electrode and/or high-temperature charge formation of the alkaline battery, improve the formation of highly conductive cobalt oxyhydroxide (CoOOH) compound and the battery capacity utilization. Without wishing to be bound by this particular theory of mechanism of operation, it is believed that the full oxidation of cobalt compounds at the surface of the nickel hydroxide particles results in a highly conductive cobalt compound that plays an important role in the high reliability, long cycling lifetime and high capacity utilization of nickel electrodes as described herein.

In one aspect, a battery cell (e.g., a rechargeable cell, such as a rechargeable nickel-zinc cell or nickel-metal hydride cell) is provided which includes a nickel hydroxide positive electrode comprising nickel hydroxide particles, cobalt metal and/or cobalt compound, and a sulfur-containing complexing agent capable of forming a complex with cobalt (e.g., a dialkyldithiocarbamate, such as sodium dialkyldithiocarbamate). The battery cell further comprises a negative electrode (e.g., a zinc electrode or a metal hydride electrode), a separator disposed between the positive electrode and the negative electrode and preventing electrical contact between the electrodes, and an electrolyte (e.g., an aqueous alkaline electrolyte) in contact with the negative electrode, the positive electrode, and the separator. In some embodiments, the selected complexing agent increases the $Co/Co^{2+}$ potential by at least about 20 mV upon binding to cobalt. In some embodiments, the positive electrode comprises a pasted portion comprising NaDDC as the complexing agent, wherein the concentration of NaDDC is between about 0.02-0.2% by weight of the pasted portion of the electrode.

In some embodiments the nickel hydroxide particles have a modified surface, wherein nickel on average has a higher oxidation state on the surface of the particles than in the bulk of the particles. In some implementations, the surface of the nickel hydroxide particles includes a coating of a cobalt compound in a highly oxidized state. The nickel hydroxide particles may also include a cobalt compound in the bulk of the particles. In some embodiments the nickel hydroxide particles further include zinc-containing material in the bulk of the particles.

After formation (charging) of the positive electrode is completed, the electrode contains CoOOH (cobalt oxyhydroxide), and, in some embodiments, includes substantially no cobalt metal (i.e. substantially all cobalt metal powder is oxidized). Preferably, the cobalt compound in the nickel hydroxide positive electrode is not significantly soluble in alkaline electrolyte at room temperature. The nickel hydroxide positive electrode may further include other additives, such as nickel metal powder, and binders. In some embodiments, the positive nickel hydroxide electrode further comprises nickel metal powder, $Y_2O_3$, $Ca(OH)_2$, and a binder. In some embodiments the positive nickel hydroxide electrode includes between about 2-10% by weight of cobalt metal and/or cobalt compound relative to the pasted portion of the electrode. The positive electrode before formation typically contains cobalt metal that is not part of the nickel hydroxide particles (added cobalt), although the nickel hydroxide particles, in many embodiments, comprise a coating of a cobalt compound, and, optionally, a cobalt compound within the bulk of the particles.

In some embodiments, the provided battery cell is a rechargeable cell. In some embodiments the battery cell comprises a zinc oxide negative electrode, where the zinc oxide negative electrode may include no more than about 10 ppm cobalt.

The use of a complexing compound and of oxidative treatment of nickel hydroxide surface are instrumental in reducing the cobalt migration to the negative electrode.

In another aspect, a positive nickel hydroxide pasted electrode is provided, as described herein. The electrode includes a sulfur-containing complexing agent, such as diethyldithiocarbamate.

In another aspect, a method of making a positive electrode for a battery is provided. The method includes (a) forming an electrode mixture comprising nickel hydroxide particles, cobalt metal and/or cobalt compound; and a sulfur-containing complexing agent capable of forming a complex with cobalt; and (b) incorporating the electrode mixture into a positive electrode. In some embodiments the provided nickel hydroxide particles have a cobalt coating on the surface, and the method further comprises oxidizing at least the cobalt coating with a strong oxidizing agent (e.g., with ammonium persulfate). The addition of a complexing agent to the paste may be performed before, during, or after oxidative treatment of the nickel hydroxide particles (including in combination, e.g., both during and after oxidation). In some embodiments, a mixture comprising a complexing agent and an oxidizer is provided. In one embodiment, the mixture includes about 85-95% by weight of the oxidizer (e.g., ammonium persulfate), and about 5-15% of NaDDC. The mixture is used to treat nickel hydroxide particles, and to form nickel hydroxide particles with a modified surface, mixed with NaDDC. The treated particles with NaDDC can then be mixed with cobalt metal, and optionally with nickel powder, and a binder, to form a pasted portion of the positive electrode.

In some embodiments, the method further includes performing charge formation of the positive electrode. In many embodiments charge formation is carried out at room temperature. In other embodiments a high-temperature charge formation is performed. For example, the method may comprise performing charge formation of the positive electrode at a temperature of between about 30-80° C., more preferably at a temperature of between about 50-70° C. In some embodiments the charge formation is performed at a current of about 0.05 C at about 50~70° C. for about 1~3 hours.

These and other features and advantages are discussed further below with reference to associated drawings.

DETAILED DESCRIPTION OF THE PRESENT INVENTION

Figure 1:
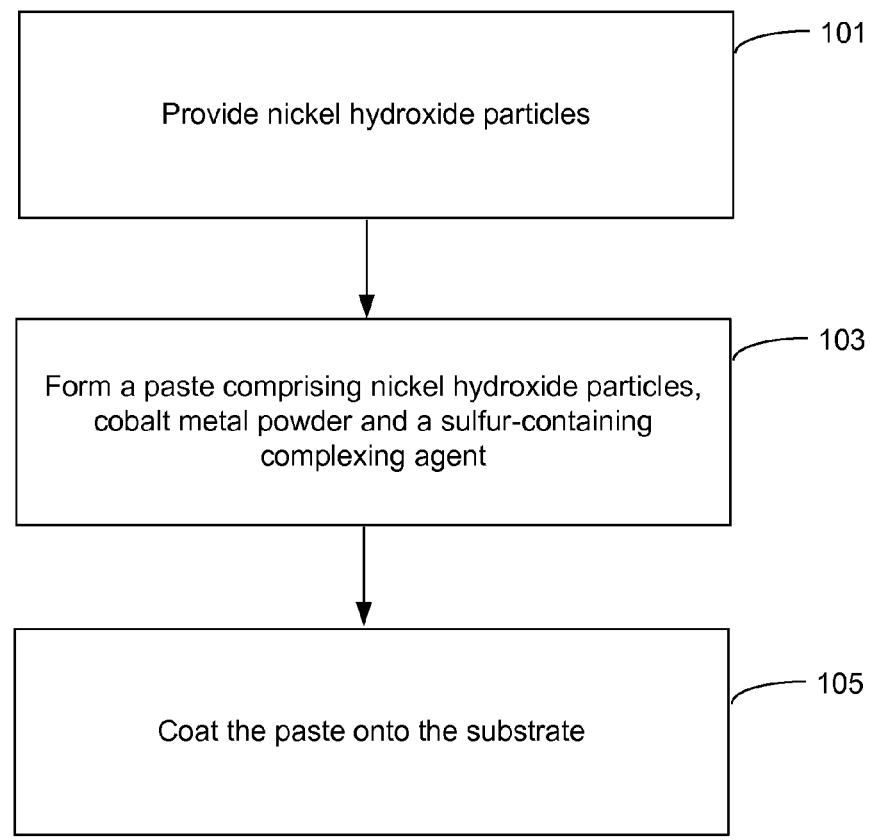
FIG. 1 is a process flow diagram for a method of preparing a positive nickel electrode in accordance with an embodiment provided herein.

Embodiments of the present invention described herein concern a positive nickel electrode for certain types of nickel containing battery cells. Those of skill in the art will understand that the following detailed description is illustrative and not limiting in the range of applications for the disclosed positive electrode. For example, the electrode may be used in various battery chemistries including nickel-zinc, nickel-cadmium and nickel-metal hydride.

INTRODUCTION

In various embodiments, the positive electrode includes nickel hydroxide particles, cobalt metal and/or cobalt compound, and a sulfur-containing complexing agent, such as diethyldithiocarbamate (DDC). In some embodiments the nickel hydroxide particles have a highly oxidized surface, e.g., the oxidation state of nickel on the surface of the particles is on average greater than the oxidation state of nickel in the bulk of the particles. Such surface may be produced by treating nickel hydroxide particles with a strong oxidizing agent during preparation of the pasted nickel electrode. In some embodiments the surface of the nickel hydroxide particles includes a cobalt coating, wherein the cobalt is highly oxidized. Rechargeable cells produced using positive electrodes having the nickel hydroxide particles and a complexing agent as described herein have been found to possess one or more of the following characteristics: long shelf life, long cycle life at moderate to high capacity, low impedance, high power density, and suitability for high rate applications. Further, in some embodiments, charge formation of the positive electrode is performed at high temperature, e.g., at a temperature of between about 50-70° C.

The need for advanced alkaline rechargeable batteries, such as for nickel-metal hydride (Ni/MH) and nickel-zinc (Ni/Zn) batteries for use in the power tools, uninterruptable power supplies (UPSs), hybrid electric vehicles (HEVs) has been widely noticed in past decade. The high-power Ni/MH batteries have been widely used in the HEVs as part of the power-assisted systems in the commercial hybrid electric vehicles. In the Toyota Prius HEV sedan, the charge current during the braking energy recovery system for the Ni/MH battery pack reaches up to 15 C. The large charge current reflects the high efficiency of the HEV energy recovery. The desired properties for the alkaline rechargeable Ni/MH batteries include high-rate charge capability, such as 10 C~15 C charge rate and overcharge capability. The improvement of the pasted nickel hydroxide electrodes should meet the needs for the high-rate charge capability and the battery overcharge capability, especially for the Ni/MH and Ni/Zn batteries.

To meet the needs of HEVs and power tools, the Ni/MH and Ni/Zn batteries should be capable to operate at high temperatures (e.g., at about 50° C.) and at high-rate charge capability (such as at 10 C~15 C charge rate). The structure of the positive nickel electrode is particularly important for achieving these properties. Spherical nickel hydroxide powder is typically used for the positive electrode. In some embodiments, a certain amount of cobalt is dissolved into the lattice of the nickel hydroxide and a certain amount of cobalt hydroxide and/or cobalt oxyhydroxide is coated on the surface of nickel hydroxide particles. The cobalt-modified nickel hydroxide particles are effective when used as the active materials in the pasted nickel electrode. The addition of several percent of zinc as solid solutions to the nickel hydroxide lattice is used in some embodiments, and is a very effective method to prevent the formation of $\gamma$-NiOOH, which causes the electrode swelling and leads to the deterioration of the cycle lifetime. The swelling of the nickel hydroxide electrode leads to a weak contact between particles of the active materials, and to an increase in the impedance of the electrode reaction, especially for high-rate or high-temperature charge/discharge processes. The conductivity of the positive electrode involves the conductive network of CoOOH on the surface of the nickel hydroxide particles. However, it is believed that the CoOOH network vanishes upon cycling because it transforms into $Co_3O_4$ or even $Co(OH)_2$ through dissolution-crystallization processes, especially at high temperatures. Thus, a large amount of CoOOH compound at the surface of the nickel hydroxide would be necessary in the pasted nickel hydroxide electrode for the high power energy systems.

In the embodiments provided herein, a complexing agent, capable of forming a complex with cobalt, such as DDC, is added to the pasted nickel hydroxide electrode, which leads to a more stable cobalt network in the pasted nickel hydroxide electrode.

In combination with the use of a complexing agent (or separately), the performance of the positive electrode can be improved by using nickel hydroxide particles with an oxidized surface (particularly nickel hydroxide particles having a coating of a cobalt compound on the surface), and by the use of high temperature charge formation.

The Components of the Nickel Positive Electrode

The positive electrode includes electrochemically active nickel hydroxide particles, which optionally may be coated with a cobalt compound and/or subjected to an oxidative treatment. In addition, the positive electrode includes cobalt metal and/or cobalt compound and a complexing agent that is capable of forming a complex with cobalt. In some embodiments the complexing compound is a sulfur-containing complexing agent, such as a dialkyldithiocarbamate, e.g., diethyldithiocarbamate. An example of a suitable complexing agent is NaDDC but other complexing agents capable of forming complexes with cobalt may be used. NaDDC is available from Aldrich Chemical Company, Milwaukee, Wis. In some embodiments the complexing agent is selected such that it increases the $Co/Co^{2+}$ potential by at least about 20 mV upon binding to cobalt.

The positive electrode may also include one or more additives to facilitate manufacturing, electron transport, wetting, mechanical properties, etc. For example, a nickel powder, (such as extra fine Ni210 powder available from Inco Special Products, Wyckoff, N.J.) is added to the electrode paste in some embodiments. In one embodiment, a positive electrode formulation may include the treated or untreated nickel hydroxide particles, the complexing agent, zinc oxide, cobalt oxide (CoO), cobalt metal, nickel metal, and a binding agent such as carboxymethyl cellulose (CMC). Note that the metallic nickel and cobalt may be elemental metals or alloys. The oxidized nickel oxide particles and associated cobalt oxide or hydroxide may be formed on the same particle, e.g., through a co-precipitation process or by precipitating the cobalt onto nickel oxide particles. In certain embodiments, the positive electrode has a composition similar to that employed to fabricate the nickel electrode in a conventional nickel cadmium battery or a conventional nickel metal hydride battery.

Other materials may be provided with the positive electrode. Examples of materials that may improve charge efficiency include strontium hydroxide ($Sr(OH)_2$), barium oxide (BaO), calcium hydroxide ($Ca(OH)_2$), $Fe_3O_4$, calcium fluoride ($CaF_2$), and yttrium oxide ($Y_2O_3$). The addition of the yttrium oxide and the calcium compounds has been shown to be beneficial for the charge acceptance at higher temperatures. See "Nickel Hydroxide Electrode: improvement of charge efficiency at high temperature" by K. Ohta, K. Hyashi, H Matsuda, Y. Yoyoguchi and Mikoma in The Electrochemical Society proceedings Volume 94-27 (Hydrogen and Metal Hydride Batteries edited by T. Sakai and P. D. Bennett), which is incorporated herein by reference for all purposes. In one of the embodiments the pasted electrode comprises treated or untreated nickel hydroxide particles, NaDDC, nickel metal powder, cobalt metal powder, a binder, and, optionally, $Y_2O_3$ and $Ca(OH)_2$.

The components of the positive electrode can be present, in some embodiments, in the following amounts (referring to weight % to the pasted portion of nickel electrode, which excludes the electrode substrate onto which the paste is applied). The complexing agent (e.g., NaDDC) is present in some embodiments at a concentration of between about 0.02-0.2 weight % (e.g., 0.05-0.2 weight %). The cobalt metal and/or compound is present, in some embodiments at a concentration of between about 2-10 weight %.

The nickel hydroxide electrode comprises, in some embodiments, nickel hydroxide powder, a complexing agent (e.g., NaDDC), nickel powder, cobalt powder or cobalt compound and binding agents. Suitable binding agents include carboxymethyl cellulose (CMC) and poly(tetrafluoroethylene) (PTFE). In a specific example, the pasted nickel hydroxide electrode composition is as follows: about 4 weight % Co powder, about 10 weight % Ni210 powder together with about 0.4 weight % sodium carboxymethyl cellulose (CMC), about 0.1~1 weight % poly(tetrafluoroethylene) (PTFE) and 0.01~1 weight % NaDDC. Nickel hydroxide powder having an oxidized surface structure makes up the balance.

In some embodiments at least one of the elements selected from the group consisting of Y, Yb, Er, Ca, Zn, Lu, Mn, Mg, Sc, Ba preferably in the form of an oxide or a compound may be contained in the pasted nickel hydroxide electrode. The amount of these elements in the pasted nickel hydroxide electrode is preferably about 0.1~1% by weight, in some embodiments. The incorporation of a compound containing one or more of these elements increases the difference between the oxygen evolution potential and the oxidation potential in the pasted nickel hydroxide electrode at higher temperature. Hence, the charge efficiency or charge acceptance of the pasted nickel hydroxide electrode can be further improved. Furthermore, addition of one or more of the above-mentioned elements in the pasted nickel hydroxide electrode can improve both high-temperature charge characteristics and high-rate discharge characteristics.

In certain embodiments, the finished positive electrode contains up to about 10 weight percent cobalt metal powder, up to about 10 weight percent of a cobalt compound such as cobalt oxide, cobalt hydroxide, or cobalt oxyhydroxide (when present), up to about 10 weight percent nickel powder (when present), up to about 3 weight percent zinc oxide (when present), up to about 1 weight percent of an oxide and/or hydroxide of any of cadmium, yttrium, calcium, barium, strontium, scandium, lanthanide, bismuth, manganese, magnesium (when present). In addition, the electrode may contain small amounts of a flow control agent such as carboxymethylcellulose (CMC) at a concentration of about 1 weight percent or less and/or a binder such as Teflon® (generally a fluorinated polyolefin such as PTFE) at a concentration of about 0.1-2 percent by weight. The balance of the positive electrode material is treated or untreated nickel hydroxide. In certain embodiments, the nickel hydroxide is present in an amount of about 60-95 weight percent.

A few representative positive electrode compositions, which can be used with addition of a complexing agent, as described herein, are described in the following documents, each of which is incorporated herein by reference: PCT Publication No. WO 02/039534 (by J. Phillips) (describing co-precipitated $Ni(OH)_2$, CoO and finely divided cobalt metal), US Patent Publication No. 2005/0003270 by J. Phillips filed Jul. 26, 2004, and US Patent Publication No. 2002/0192547 by J. Phillips filed Mar. 15, 2002 (describing fluoride additives), each of which is incorporated herein by reference.

The nickel hydroxide electrode is generally provided on a current conducting substrate such as a nickel foam matrix, although other substrate forms such as foils, perforated sheets, and expanded metals may also be used. In one example, the nickel foam is provided by Inco, Ltd. In certain embodiments, the foam substrate thickness may be between about 15 and 60 mils. In a specific embodiment, the thickness of the positive electrode, comprising nickel foam filled with the electrochemically active and other electrode materials, ranges from about 16 to 24 mils. In one embodiment, positive electrode is about 20 mils thick.

In a specific embodiment, nickel foam of density ranging from about 300-500 $g/m^2$ is used. An even more preferred range is between about 350-500 $g/m^2$. In one embodiment nickel foam of density of about 350 $g/m^2$ is used. As the width of the electrode layer is decreased, the foam may be made less dense to ensure there is sufficient void space. In a specific embodiment, a nickel foam density of about 350 $g/m^2$ and thickness ranging from about 16-18 mils is used.

Methods of making positive nickel electrodes may include both wet and dry processes. Addition of complexing agent can be integrated, for example with wet processes are described in U.S. Pat. No. 7,833,663, issued Nov. 16, 2010, titled Methods of Manufacturing Nickel Zinc Batteries by Phillips et al. which is incorporated herein by reference. For example, the pasted nickel hydroxide electrode may be made using a mixture of the treated or non-treated nickel hydroxide powder, together with other positive electrode components (e.g., complexing agent, cobalt powder, nickel powder, CMC and PTFE) in a paste. The active material paste is forced into nickel foam and pressed to form a nickel electrode plate. In other embodiments, the positive electrode is made by a dry process which does not employ substantial water or other liquid. Addition of the complexing agent may be incorporated into a dry process described for example in U.S. patent application Ser. No. 11/367,028, filed Mar. 1, 2006 titled Methods of Manufacturing Nickel Zinc Batteries by Phillips et al., which is incorporated herein by reference. The component materials of nickel hydroxide, nickel and cobalt powders are dry blended together with a suitable binder and are introduced into a hopper. A complexing agent may be added during blending. A continuous strip of foam nickel is drawn through the powder while rotating brushes force material into the foam pores. A compression roller step sizes the foam to the appropriate porosity.

Nickel Hydroxide Particles

As indicated, positive electrodes described herein employ nickel hydroxide particles which may be treated or untreated in a surface oxidizing process. Generally such particles comprise primarily nickel hydroxide, but depending upon the source and fabrication procedure, they may also contain limited amounts of other nickel compounds such as nickel oxyhydroxide and nickel oxide. Nickel materials used as starting materials for the processes described herein may contain any amounts of nickel hydroxide, nickel oxyhydroxide, nickel oxide, and the like. Frequently the starting material contains primarily nickel hydroxide with only small amounts of other nickel compounds, e.g., less than about 5% by weight and more typically less than about 1% by weight. Such materials that include primarily nickel hydroxide, but may contain small amounts of other nickel compounds such as oxides and oxyhydroxides, will be referred to herein as nickel hydroxide or nickel hydroxide particles.

Of course, during normal cell operation, nickel hydroxide is converted to nickel oxyhydroxide during charge and the oxyhydroxide is converted to the hydroxide during discharge, and the present invention covers nickel hydroxide electrodes in various states of charge. Unless otherwise qualified, the electrode concentrations recited throughout the application refer to those existing at the time the electrode is fabricated and prior to charge formation.

In certain embodiments, the nickel hydroxide starting material includes limited amounts of non-nickel compounds such as cobalt oxides or hydroxides and/or zinc oxides or hydroxides. In a specific embodiment, the nickel hydroxide material used in electrodes described herein contains between about 0 and 5% zinc compound by weight in the lattice, and in some embodiments between about 3 and 4% zinc compound by weight (e.g., about 3.5 weight percent). Further, in a specific embodiment, the nickel hydroxide material contains between about 0 and 5% cobalt compound by weight in the lattice, and in some embodiments between about 1 and 3% cobalt compound by weight (e.g., about 2 weight % cobalt).

In some embodiments, the nickel hydroxide particles of the starting material are coated with cobalt oxide or cobalt hydroxide. Such coatings are provided in addition to the embedded or entrained cobalt compounds described above. While such coatings may provide benefits in various embodiments, in some cases they should be present in only limited amounts to ensure the underlying nickel hydroxide matrix is effectively oxidized by a treatment as described herein. In some examples, the cobalt compound coating is provided at an average thickness of not greater than about 1 micrometer, more typically between about 0.1 and 0.7 micrometers. Further, the cobalt compound coating may be present in the particles in an amount of about 0.01 to 3% by weight, or more specifically between about 0.1 and 1% by weight. In one example, the cobalt compound coating is cobalt oxyhydroxide present in an amount of about 0.5% by weight.

Nickel hydroxide particles coated with cobalt compounds (as well as uncoated particles) may be obtained from various commercial vendors such as Changsha Research Institute (CRI) (P. R. China) and Kelong Power Sources Co. Ltd. (P. R. China). A cobalt oxide or hydroxide coating may be applied by various techniques such as the chemical reaction of a cobalt salt such as cobalt sulfate and an alkali metal hydroxide with nickel hydroxide powder, or the reaction of dissolved cobalt ion ($Co(OH)_4^{2-}$) in an alkali metal hydroxide aqueous solution at the surface of the nickel hydroxide particle. In one embodiment further described herein a thin layer of cobalt compound is coated on nickel hydroxide particles by contacting such particles with an alkaline solution of an appropriate cobalt compound such as cobalt sulfate.

In certain embodiments, at least some of the zinc oxide and cobalt oxide are provided with the nickel hydroxide in a chemical mixture, whereby individual particles contain nickel hydroxide along with zinc oxide and cobalt oxide. Such premixed materials may be prepared by co-precipitation of the individual components or may be acquired in a commercially available formula from commonly known vendors such as International Nickel Corporation, and Tanaka. These materials resist leaching of the cobalt oxide and zinc oxide by locking the oxides into the insoluble nickel hydroxide matrix. Co-precipitation also apparently helps charge transfer efficiency by creating conductive channels through the positive electrode materials. In a preferred embodiment, the zinc oxide and cobalt oxide are each present in the co-precipitated material in concentrations of about 2-3% by weight for the zinc and 2-6% for the cobalt oxide. Other materials may be used in place of (or in addition to) cobalt oxide. These include strontium hydroxide ($Sr(OH)_2$), barium oxide (BaO), calcium hydroxide ($Ca(OH)_2$), $Fe_3O_4$, calcium fluoride ($CaF_2$), and yttrium oxide ($Y_2O_3$). Any of which may be provided as chemically homogeneous components or may be co-precipitated with nickel hydroxide or otherwise locked in a nickel hydroxide matrix.

The nickel hydroxide particles may be provided in various forms such as powders, granules, etc. In certain embodiments, the nickel hydroxide particles employed with this invention have an average size (diameter or longest dimension) of about 0.1 µm to 20 µm, and in a specific embodiment, between about 0.5 µm and 12 µm.

Regardless of whether the nickel hydroxide particles are coated or uncoated with a cobalt compound, in an embodiment, which employs surface-oxidized particles their surfaces have a chemical and/or physical state that is distinct from conventional or commercial nickel hydroxide, which may be present in the interiors of the particles. This distinct state will be referred to herein as "modified." While this state will typically be limited to the surface regions of the nickel hydroxide particles, this need not be the case, and in certain embodiments, the state exists well into the particle interior and in some cases throughout the entire particle. While preferably modified nickel hydroxide particles are used in combination with the addition of complexing agent, in some embodiments, the pasted electrode can be made using non-modified nickel hydroxide particles.

The "modified" surface state is characterized by one or more of the following features: a higher oxidation state at the surface layer of the nickel hydroxide particles, an increase in the particles' dry weight of, e.g., up to about 3 weight % (often between about 1 to 3 weight %), a change in nickel hydroxide lattice morphology at the surface, and inclusion of alkali metal ions in the outer matrix. The higher oxidation state is achieved in comparison with that of the starting material. For example, if the starting material is entirely nickel (II) hydroxide, the resulting modified material will have, on average, an oxidation state that is greater than 2. In certain embodiments, the oxidation state of the modified outer region is, on average, greater than about 2.1, and in further embodiments greater than about 3. In some cases, it is between about 3 and 3.25. The weight increase is based on a difference in dry weights of the starting product and the final product. The alkali metal ions may result from the cations used in the oxidizing agent and/or the alkali metal hydroxide used to treat the particles as described below. In addition, the nickel hydroxide particles have a black color, which remains stable over an extended period, e.g., a period of months or longer. Examples of suitable processes for producing such modified state on the surface of nickel hydroxide particles are described below. To the extent that the nickel compound particles are coated with a cobalt compound, the cobalt compound may, like the nickel, exist in a highly oxidized state, e.g., greater than about 3 and sometimes in the range of about 3 to 3.25.

The modified nickel hydroxide or cobalt hydroxide appears to inhibit cobalt and zinc in the nickel hydroxide lattice from dissolving into the alkaline electrolyte.

The Nickel Hydroxide Modification Process

Oxidative modification of nickel hydroxide particles is described in detail in U.S. Pat. No. 8,048,566 issued Nov. 1, 2011, titled Nickel Hydroxide Electrode for Rechargeable Batteries by Geng et al., which is herein incorporated by reference. Addition of a complexing agent can be integrated into this modification process, and can be performed before, after, or during oxidation (including in combination, such as both during and after oxidation). Nickel hydroxide particles, with or without a thin coating of cobalt compound, are treated with a strong oxidizing agent under alkaline conditions and at high temperature. In some embodiments, the complexing agent is mixed with the oxidizer, and this mixture is contacted with the nickel hydroxide particles. This produces a modified surface of the nickel hydroxide particles as described above. The high temperature treatment is performed in some embodiments, e.g., at between about 90 and 150° C., and in more specific embodiments between about 100 and 130° C., and in some embodiments between about 120 and 125° C. The hydroxide concentration levels are between about 5% and 30% by weight, and in more specific embodiments between about 10% and 15% by weight. The strong oxidizing agent is an inorganic or organic reagent such as an aqueous solution of a persulfate or permanganate salt. The treatment with a strong oxidation agent at high temperature produces a surface structure and oxidation state change at the surface layer of the nickel hydroxide particles. In certain embodiments, as indicated above, the treatment of the nickel hydroxide particles results in an increase in the material's weight of up to about 3 weight % (e.g., about 1 to 3 weight %) of dry particles. It is believed that the nickel hydroxide lattice morphology is altered and/or there is alkali metal ions present in the outer matrix.

In some embodiments, a mixture of a complexing agent and an oxidizer is provided, containing between about 85-95 weight % of the oxidizer (e.g., ammonium persulfate) and between about 5-15 weight % of the complexing agent (e.g., NaDDC).

In certain specific embodiments, mixing continues for about 5 to 200 minutes at between 100 and 150 degrees Centigrade. Mixing can be accomplished by stirring or other suitable process. After the reaction is complete, it may be necessary to separate the oxidized particles from the liquid solution. Such separation may include multiple steps. In one embodiment, the reaction products are initially washed with distilled water. The excess water may be decanted from the mixing vessel. The resulting nickel hydroxide may be further dried before use in the actual positive electrode paste operation. In another embodiment, the mixture may be filtered first before it is washed with distilled water or another suitable washing solution.

A Method of Preparing a Nickel Electrode

An example of a process flow for preparing a nickel hydroxide electrode is shown in FIG. 1. In operation 101, nickel hydroxide particles as described above (treated or untreated with an oxidizer) are provided. Next, in operation 103, a paste comprising nickel hydroxide particles, cobalt metal powder, and a sulfur-containing complexing agent, e.g., NaDDC is formed. Optionally, nickel powder, one or more binders or other additives may be added to the paste. After the paste has been formed, the paste is coated onto the substrate, e.g., nickel foam.

Figure 2:
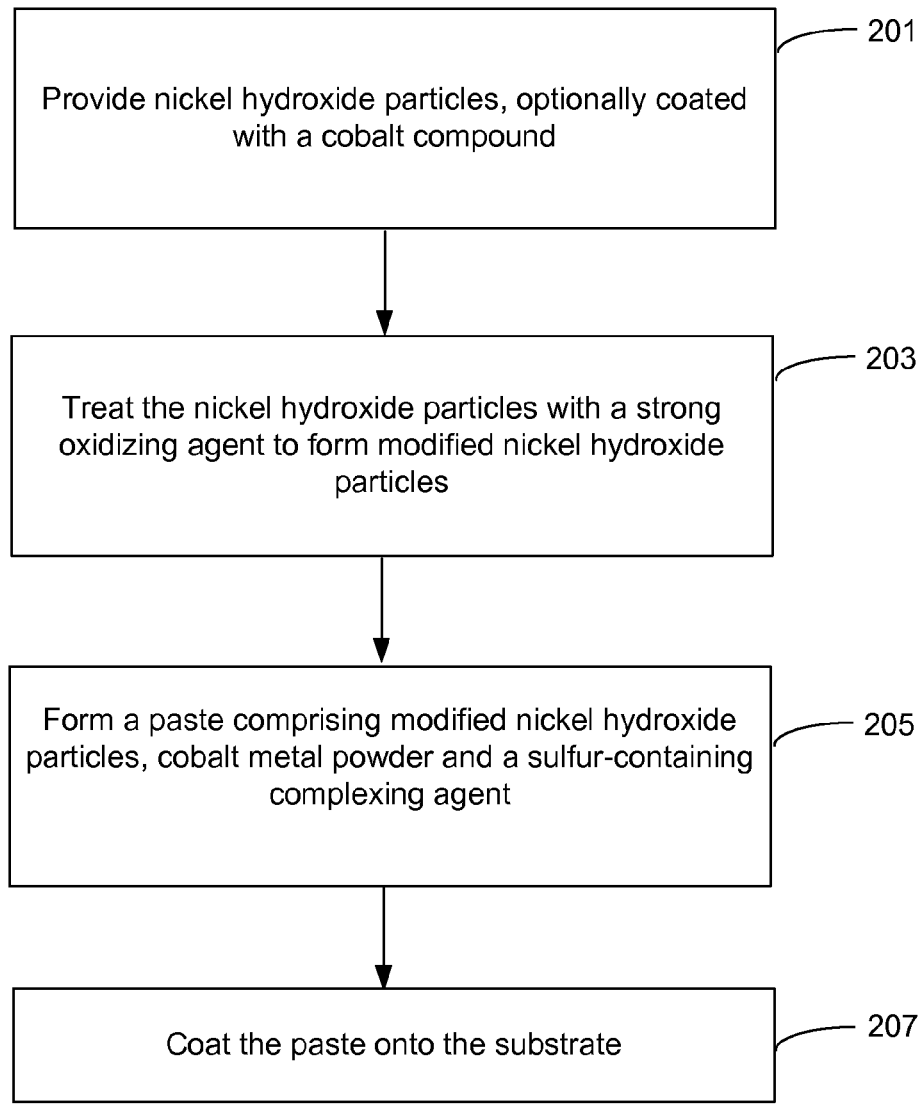
FIG. 2 is a process flow diagram for a method of preparing a positive nickel electrode in accordance with an embodiment provided herein.

Another example of a process flow for preparing a nickel hydroxide electrode is shown in FIG. 2. In this example, nickel hydroxide particles having a modified oxidized surface are used. In operation 201, nickel hydroxide particles are provided. The particles may be optionally coated with a cobalt compound. In operation 203, the nickel hydroxide particles are treated with a strong oxidizing agent (e.g., ammonium persulfate) to form modified nickel hydroxide particles. In operation 205, a paste including modified nickel hydroxide particles, cobalt metal powder, and a sulfur-containing complexing agent is formed. The complexing agent can be added at any time before, during, or after treatment of nickel hydroxide with an oxidizing agent. Finally, in operation 207, the formed paste is coated onto a substrate.

Nickel Battery and Battery Components

Figure 3B:
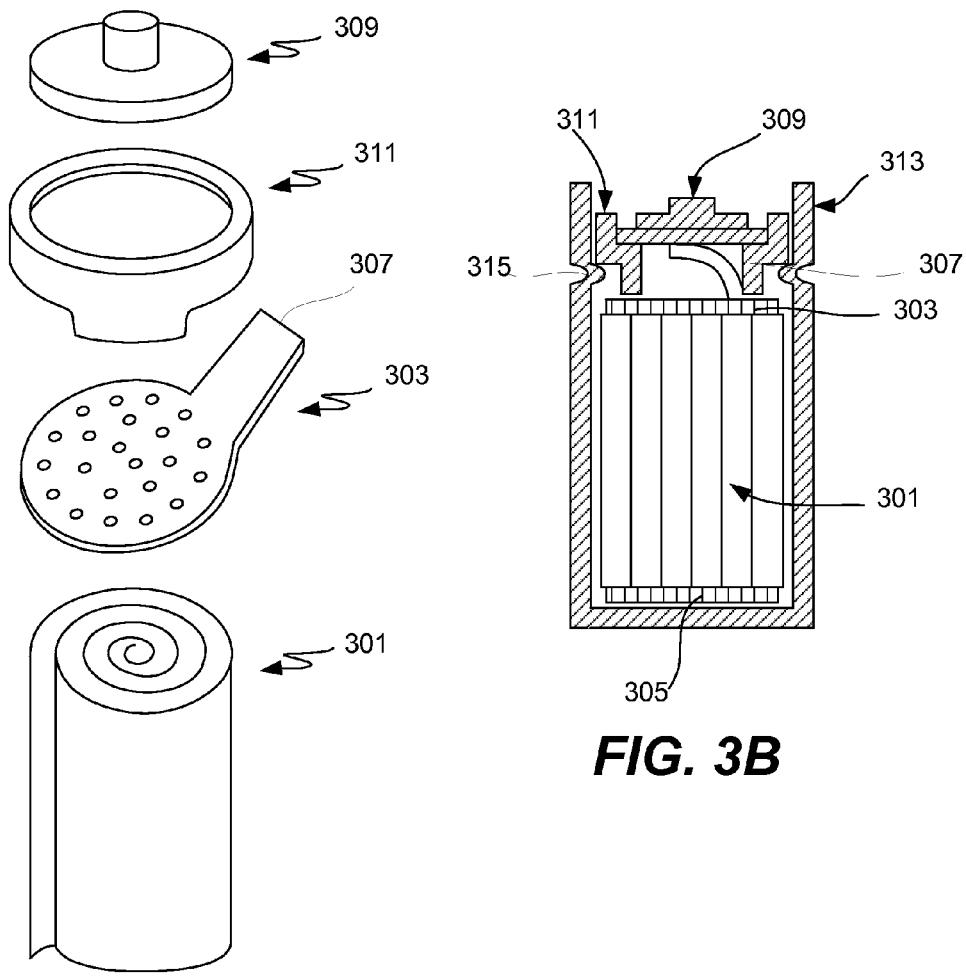
FIG. 3B is a diagrammatic cross-sectional view of an assembled nickel zinc battery cell suitable for practicing the present invention.
Figure 3A:
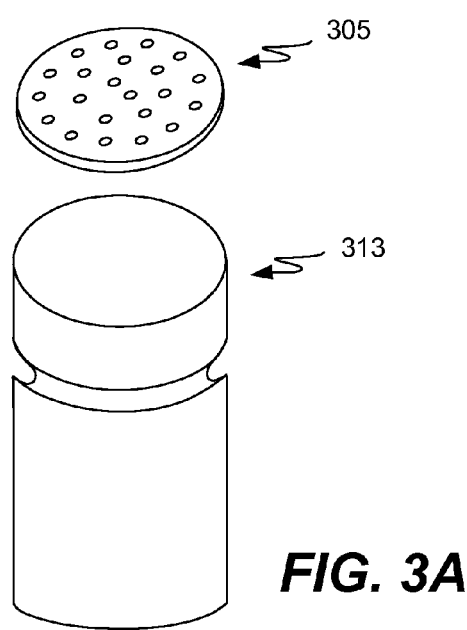
FIG. 3A is an exploded diagram of a nickel zinc battery cell suitable for practicing the present invention.

FIGS. 3A and 3B are graphical representations of the main components of a cylindrical power cell according to an embodiment of the invention, with FIG. 3A showing an exploded view of the cell. Alternating electrode and electrolyte layers are provided in a cylindrical assembly 301 (also called a "jellyroll"). The cylindrical assembly or jellyroll 301 is positioned inside a can 313 or other containment vessel. A negative collector disk 303 and a positive collector disk 305 are attached to opposite ends of cylindrical assembly 301. The negative and positive collector disks function as internal terminals, with the negative collector disk electrically connected to the negative electrode and the positive collector disk electrically connected to the positive electrode. A cap 309 and the can 313 serve as external terminals. In the depicted embodiment, negative collector disk 303 includes a tab 307 for connecting the negative collector disk 303 to cap 309. Positive collector disk 305 is welded or otherwise electrically connected to can 313. In other embodiments, the negative collector disk connects to the can and the positive collector disk connects to the cap.

The negative and positive collector disks 303 and 305 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution.

A flexible gasket 311 rests on a circumferential bead 315 provided along the perimeter in the upper portion of can 313, proximate to the cap 309. The gasket 311 serves to electrically isolate cap 309 from can 313. In certain embodiments, the bead 315 on which gasket 311 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment as shown in FIG. 3B. The gasket is typically sealed by a crimping process. In certain embodiments, a sealing agent is used to prevent leakage. Examples of suitable sealing agents include bituminous sealing agents, tar and VERSAMID® available from Cognis of Cincinnati, Ohio.

In certain embodiments, the cell is configured to operate in an electrolyte "starved" condition. Further, in certain embodiments, nickel-zinc cells employ a starved electrolyte format. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116,113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The battery cells provided herein can have any of a number of different shapes and sizes. For example, cylindrical cells of this invention may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, e.g., a power tool or lawn tool will dictate the size and shape of the battery cells. This invention also pertains to battery packs including one or more nickel-zinc battery cells described herein and appropriate casing, contacts, and conductive lines to permit charge and discharge in an electric device.

Note that the embodiment shown in FIGS. 3A and 3B has a polarity reverse of that in a conventional nickel-cadmium cell, in that the cap is negative and the can is positive. In conventional power cells, the polarity of the cell is such that the cap is positive and the can or vessel is negative. That is, the positive electrode of the cell assembly is electrically connected with the cap and the negative electrode of the cell assembly is electrically connected with the can that retains the cell assembly. In certain embodiments, including that depicted in FIGS. 3A and 3B, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap.

The can is the vessel serving as the outer housing or casing of the final cell. In conventional cells, where the can is the negative terminal, it is typically nickel-plated steel. As indicated, in provided cells the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion. In embodiments where the can is positive and the cap negative, the can may be a composition similar to that used in convention nickel-cadmium cells, typically nickel-plated steel.

In some embodiments, the interior of the can may be coated with a material to aid hydrogen recombination. Any material that catalyzes hydrogen recombination may be used. An example of such a material is silver oxide.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell is designed to operate at this pressure and even higher (e.g., up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Some details of the structure of a vent cap and disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Electrodes and Separator Structure

Figure 4:
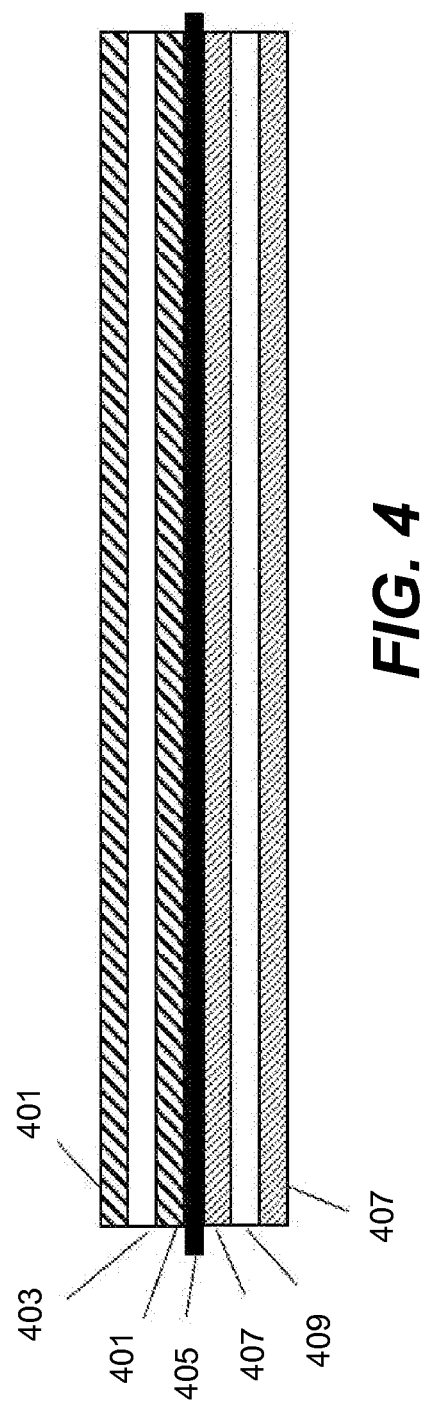
FIG. 4 illustrates the various layers in the negative electrode-separator-positive electrode sandwich structure in accordance with an embodiment of the present invention.

FIG. 4 illustrates layers in the negative electrode-separator-positive electrode sandwich structure which may be used in a jellyroll or prismatic cell structure. The separator 405 mechanically and electrically separates the negative electrode (components 401 and 403) from the positive electrode (components 407 and 409) while allowing ionic current to flow between the electrodes. The negative electrode includes electrochemically active layers 401 and an electrode substrate 403. The electrochemically active layers 401 of the zinc negative electrode typically include zinc oxide and/or zinc metal as the electrochemically active material. The layer 401 may also include other additives or electrochemically active compounds such as calcium zincate, bismuth oxide, aluminum oxide, indium oxide, hydroxyethyl cellulose, and a dispersant.

The electrode substrate 403 should be electrochemically compatible with the negative electrode materials 401. As described above, the electrode substrate may have the structure of a perforated metal sheet, an expanded metal, a metal foam, or a patterned continuous metal sheet.

Opposite from the negative electrode on the other side of the separator 405 is the positive electrode. The positive electrode also includes electrochemically active layers 407 and an electrode substrate 409. The layers 407 of the positive electrode may include nickel hydroxide, nickel oxide, and/or nickel oxyhydroxide as electrochemically active materials and various additives, all of which are described above. The electrode substrate 409 may be, for example, a nickel metal foam matrix or nickel metal sheets. Note that if a nickel foam matrix is used, then layers 907 would form one continuous electrode.

The Negative Electrode

As applied to nickel-zinc cells, the negative electrode includes one or more electroactive sources of zinc or zincate ions optionally in combination with one or more additional materials such as conductivity enhancing materials, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may comprise one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide.

If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada.

The zinc active material may exist in the form of a powder, a granular composition, etc. Preferably, each of the components employed in a zinc electrode paste formulation has a relatively small particle size. This is to reduce the likelihood that a particle may penetrate or otherwise damage the separator between the positive and negative electrodes.

Considering electrochemically active zinc components in particular (and other particulate electrode components as well), such components preferably have a particle size that is no greater than about 40 or 50 micrometers. In certain embodiments, the material may be characterized as having no more than about 1% of its particles with a principal dimension (e.g., diameter or major axis) of greater than about 50 micrometers. Such compositions can be produced by, for example, sieving or otherwise treating the zinc particles to remove larger particles. Note that the particle size regimes recited here apply to zinc oxides and zinc alloys as well as zinc metal powders.

In addition to the electrochemically active zinc component(s), the negative electrode may include one or more additional materials that facilitate or otherwise impact certain processes within the electrode such as ion transport, electron transport (e.g., enhance conductivity), wetting, porosity, structural integrity (e.g., binding), gassing, active material solubility, barrier properties (e.g., reducing the amount of zinc leaving the electrode), corrosion inhibition etc.

For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of hydrogen and oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps may be taken to preserve battery components, including the negative electrode, in their chemically useful form. When electrode materials corrode or otherwise degrade to a significant extent over weeks or months without use, their value becomes limited by short shelf life.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Examples of materials that may be added to the negative electrode to improve wetting include titanium oxides, alumina, silica, alumina and silica together, etc. Generally, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Examples of materials that may be added to the negative electrode to improve electronic conductance include various electrode compatible materials having high intrinsic electronic conductivity. Examples include titanium oxides, etc. Generally, these materials are provided in concentrations of up to about 10% by weight of a dry negative electrode formulation. The exact concentration will depend, of course, on the properties of chosen additive.

Various organic materials may be added to the negative electrode for the purpose of binding, dispersion, and/or as surrogates for separators. Examples include hydroxyethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc.

In certain embodiments, polymeric materials such as PSS and PVA may be mixed with the paste formation (as opposed to coating) for the purpose of burying sharp or large particles in the electrode that might otherwise pose a danger to the separator.

When defining an electrode composition herein, it is generally understood as being applicable to the composition as produced at the time of fabrication (e.g., the composition of a paste, slurry, or dry fabrication formulation), as well as compositions that might result during or after formation cycling or during or after one or more charge-discharge cycles while the cell is in use such as while powering a portable tool.

Various negative electrode compositions within the scope of this invention are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals.

Finally, it should be noted that while a number of materials may be added to the negative electrode to impart particular properties, some of those materials or properties may be introduced via battery components other than the negative electrode. For example, certain materials for reducing the solubility of zinc in the electrolyte may be provided in the electrolyte or separator (with or without also being provided to the negative electrode). Examples of such materials include phosphate, fluoride, borate, zincate, silicate, stearate. Other electrode additives identified above that might be provided in the electrolyte and/or separator include surfactants, ions of indium, bismuth, lead, tin, calcium, etc.

The Separator

Typically, a separator will have small pores. In certain embodiments the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a certain embodiments, the separator comprises at least two layers (and preferably exactly two layers)—a barrier layer to block zinc penetration and a wetting layer to keep the cell wet with electrolyte, allowing ionic current to flow. This is generally not the case with nickel cadmium cells, which employ only a single separator material between adjacent electrode layers.

Performance of the cell may be aided by keeping the positive electrode wet and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. The barrier layer is typically about 0.5-4 mils thick, more preferably between about 1.5 and 4 mils thick.

The wetting layer may be made of any suitable wettable separator material. Typically the wetting layer has a relatively high porosity e.g., between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable.

Another consideration in the electrode/separator design is whether to provide the separator as simple sheets of approximately the same width as the electrode and current collector sheet or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

The Electrolyte

In certain embodiments pertaining to nickel-zinc cells, the electrolyte composition limits dendrite formation and other forms of material redistribution in the zinc electrode. Examples of suitable electrolytes are described in U.S. Pat. No. 5,215,836 issued to M. Eisenberg on Jun. 1, 1993, which is hereby incorporated by reference. In some cases, the electrolyte includes (1) an alkali or earth alkali hydroxide, (2) a soluble alkali or earth alkali fluoride, and (3) a borate, arsenate, and/or phosphate salt (e.g., potassium borate, potassium metaborate, sodium borate, sodium metaborate, and/or a sodium or potassium phosphate). In one specific embodiment, the electrolyte comprises about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications comprises about 8.5 equiv/liter of hydroxide, about 4.5 equivalents of boric acid and about 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may comprise a liquid and a gel. The gel electrolyte may comprise a thickening agent such as CARBOPOL® available from Noveon of Cleveland, Ohio. In a preferred embodiment, a fraction of the active electrolyte material is in gel form. In a specific embodiment, about 5-25% by weight of the electrolyte is provided as gel and the gel component comprises about 1-2% by weight CARBOPOL®.

In some cases, the electrolyte may contain a relatively high concentration of phosphate ion as discussed in U.S. patent application Ser. No. 11/346,861, filed Feb. 1, 2006 and incorporated herein by reference for all purposes.

Modified Nickel Hydroxide Particles with Oxidized Surface

In certain embodiments, a nickel hydroxide electrode contains nickel hydroxide particles, cobalt or a cobalt compound, and, optionally, nickel powder. The nickel hydroxide particles may contain some cobalt oxide and/or hydroxide with the cobalt present in one or more valences (II and/or III). In some cases, the nickel hydroxide particles are coated with a thin layer of the cobalt oxide and/or hydroxide. They may also include some amount of zinc oxide. In certain embodiments described herein, the surface layer of the nickel hydroxide particles (with or without a cobalt compound present) is treated using an alkaline solution of a strong oxidizing agent such as sodium or potassium persulfate to modify the surface nickel hydroxide structure. In some embodiments the oxidation state of cobalt in the cobalt coating of nickel hydroxide particles after oxidation is greater than 3. The resulting modified surface structure has been found to impart various benefits to electrodes formed from the nickel hydroxide. Without wishing to be bound by a particular theory of operation, it is believed that the modified surface structure facilitates an interfacial reaction between the nickel hydroxide and cobalt metal and/or cobalt compounds in the positive electrode to inhibit cobalt from leaving the positive electrode during contact with electrolyte. In this regard, it may inhibit cobalt (and zinc) compounds in the nickel hydroxide particles from dissolving into the alkaline battery electrolyte at high temperature. Further, it is believed that the oxidation of cobalt compounds at the surface of the nickel hydroxide particles results in a highly conductive cobalt compound that plays an important role in high reliability, high stability and high capacity utilization of nickel electrodes as described herein.

The positive electrodes described herein show minimal dissolution of cobalt during cell fabrication, soaking, and cycling. In rechargeable nickel-zinc batteries reduced cobalt migration from the positive electrode to the zinc electrode results in a significant reduction in self-discharge and therefore improved reliability. Nickel-zinc batteries using this composition of a positive electrode also show markedly improved capacity retention as they are cycled.

Certain aspects of the invention provide methods of making a positive electrode for a battery, which methods may be characterized by the following operations: (a) mixing a hydroxide solution and a strong oxidizing agent with nickel hydroxide at a temperature of at least about 90° C. to produce a modified nickel hydroxide; (b) separating the modified nickel hydroxide from a mixture resulting from (a); (c) preparing an electrode mixture comprising the modified nickel-hydroxide; and (d) incorporating the electrode mixture into a positive electrode. In certain embodiments, the strong oxidizing agent is a permanganate, a perchlorate, a persulfate, and/or ozone. In certain embodiments, operation (a) is performed at a temperature of about 90° C. to about 150° C., and in some cases it is performed for a period of between about 5 minutes and 200 minutes. The complexing agent can be added to the mixture at any time before, during, or after the treatment with the oxidizer. In some embodiments, nickel hydroxide particles are contacted with a mixture containing an oxidizer and a complexing agent.

In some cases, the nickel hydroxide is a powder comprising nickel hydroxide particles coated with a cobalt compound such as cobalt oxide, cobalt hydroxide, and/or cobalt oxyhydroxide. The cobalt compound may comprise up to about 1 weight percent of the nickel hydroxide powder. Such cobalt coated particles may be prepared by mixing the nickel hydroxide with an alkali metal hydroxide and a cobalt salt solution. The coating may be performed at a temperature of between about 40° C. and about 60° C.

The separation process may involve (a) washing the modified nickel hydroxide; and (b) drying the modified nickel hydroxide. In some embodiments, the separation involves (a) filtering the modified nickel hydroxide; and (b) washing the filtered modified nickel hydroxide.

The positive electrode resulting from the above process may, in various embodiments, contain between about 60 to 95% by weight of the modified nickel hydroxide and up to about 10% of cobalt metal and/or a cobalt compound. In a specific example, the cobalt compound is cobalt oxide, cobalt hydroxide, cobalt oxyhydroxide, or a combination thereof.

Another aspect of the invention pertains to a galvanic cell characterized by the following elements: (a) a negative electrode; (b) a nickel hydroxide positive electrode; (c) a separator disposed between the positive electrode and the negative electrode and preventing electrical contact therebetween; and (d) an electrolyte in contact with the negative electrode, the positive electrode and the separator. The nickel hydroxide positive electrode may contain (i) nickel hydroxide particles having a modified surface comprising nickel in a higher oxidation state on average than is present in the bulk of the particles, and (ii) cobalt metal and/or a cobalt compound. In various embodiments, the cobalt compound is cobalt oxide, cobalt hydroxide, and/or cobalt oxyhydroxide. In some cases, the nickel hydroxide particles have a coating of a cobalt compound, with at least about 90% by weight of the cobalt compound in the coating being highly oxidized cobalt.

In some embodiments, the nickel hydroxide positive electrode contains about 60 to 95 weight percent nickel hydroxide particles having a modified surface. The cobalt metal and/or cobalt compound may be present in the positive electrode at levels up to about 10 weight percent, each. In further embodiments, the positive electrode includes one or more of the following: nickel metal powder, $Y_2O_3$, $Ca(OH)_2$, and a binder.

In some preferred implementations, the negative electrode is zinc oxide negative electrode, and the resulting cell may achieve a cycle life of at least about 500 cycles at a discharge rates of about 5 C or greater. Preferably, the zinc oxide negative electrode contains less than about 10 ppm cobalt. This low level of cobalt may be achieved using the modified positive electrodes described herein. In some cases, the positive electrode may be characterized by having a cobalt compound that is not significantly soluble in the electrolyte at room temperature, with the electrolyte being an alkaline electrolyte.

Cobalt in Pasted Nickel Hydroxide Electrode

The role of added cobalt metal in the nickel positive electrode is important. Without wishing to be bound by a specific theory, it is believed that cobalt metal is transformed into a conductive CoOOH network in the positive electrode. The suggested mechanism is discussed with reference to equations [1]-[3].

The addition of metal cobalt powder in the pasted nickel hydroxide electrode has the reactions at the formation charge of the nickel electrode as follows:

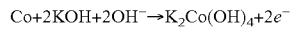

$$Co+2KOH+2OH^- \rightarrow K_2Co(OH)_4+2e^- \quad [1]$$

$$2K_2Co(OH)_4+2OH^- \rightarrow 2CoOOH+4KOH+2H_2O+2e^- \quad [2]$$

The reaction for the CoOOH formation during the first charge of the pasted nickel hydroxide can be rewritten as follows

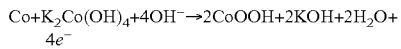

$$Co+K_2Co(OH)_4+4OH^- \rightarrow 2CoOOH+2KOH+2H_2O+4e^- \quad [3]$$

According the reaction process shown in equation [1], the metal cobalt powder starts to dissolve into an alkaline electrolytic solution and thereafter re-precipitates as the $Co(OH)_4^{2-}$ dicobaltite followed by formation of a conductive CoOOH network connecting the positive active material particles as the current collector to one another. This transformation is illustrated by equation [2]. The combined processes with the metal cobalt powder dissolving, including $Co/Co^{2+}$ and $Co^{2+}/Co^{3+}$ reactions, co-exist in the cobalt reaction processes, and are illustrated in equation [3]. The resulting conductive CoOOH network changes into a satisfactory conductive cobalt compound in the first formation charge of the battery. Consequently, the capacity utilization of the positive active materials is improved after the metal cobalt powder fully transfers into the CoOOH compound. The first formation charge of the battery plays important role on the formation of the CoOOH conductive network and the battery capacity utilization.

Figure 5:
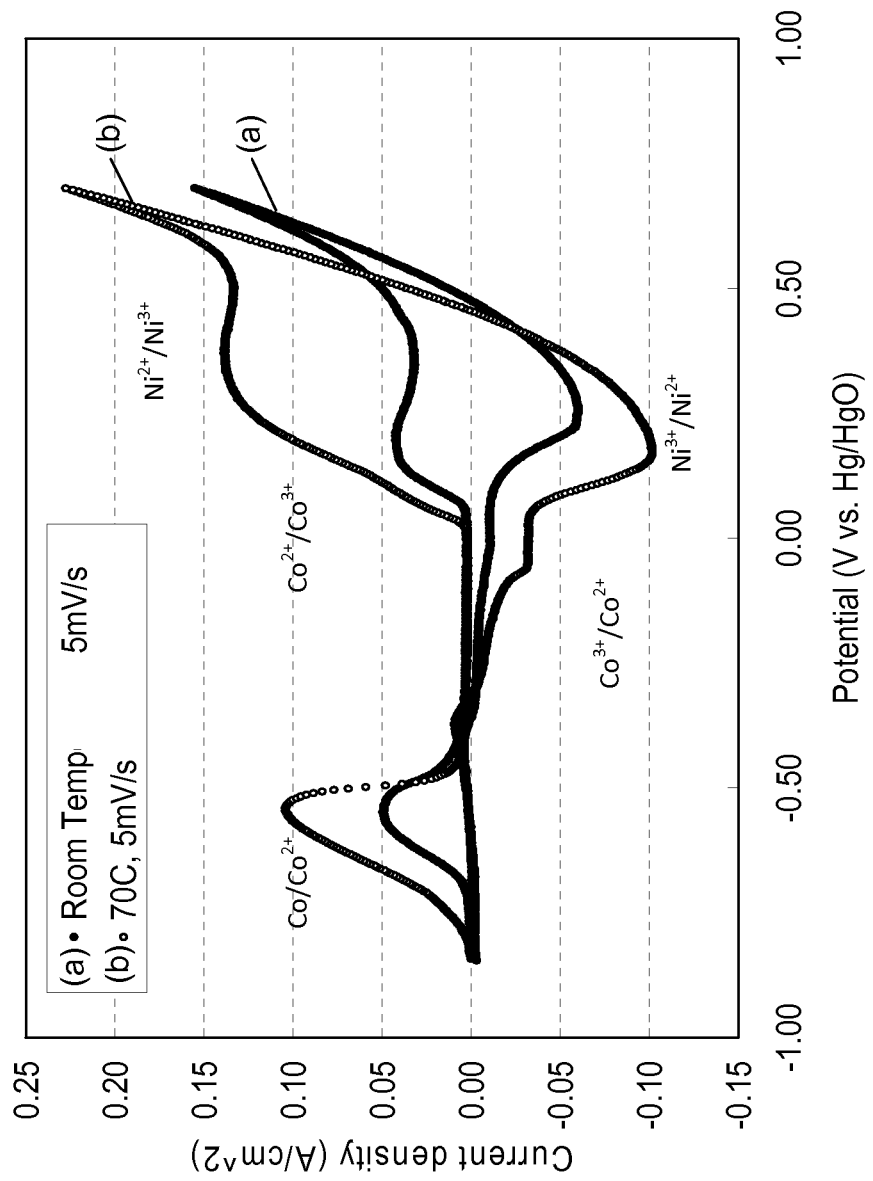
FIG. 5 is a cyclic voltammetry (CV) plot for a pasted nickel electrode plate at a linear-sweep voltammetry with 5 mV/s scan rate at room temperature and at 70° C.

FIG. 5 shows the cyclic voltammetry (CV) of a pasted nickel electrode plate at a linear-sweep voltammetry with 5 mV/s scan rate at room temperature (curve (a)) and at 70° C. (curve (b)). The nickel hydroxide electrode is composed of 10 wt. % of Ni210 powder, 4 wt. % Co powder, 0.3 wt. % carboxymethyl cellulose (CMC) with the balance being surface-modified nickel hydroxide powder. The substrate of the pasted nickel electrode uses the 350 g/m² nickel foam. The linear sweep potential is between –0.8V~0.8V vs. Hg/HgO. It is shown that the $Co/Co^{2+}$ reaction happens at the potential of between –0.8V~–0.4V vs Hg/HgO and the $Co^{2+}/Co^{3+}$ reaction happens at the potential of between 0.1V~0.5V vs Hg/HgO. At the first formation charge of the nickel electrode, the potential plateau of pasted nickel hydroxide electrode should occur in range between –0.8V~–0.4V vs Hg/HgO. The potential between –0.8V~–0.4V reflects the $Co/K_2Co(OH)_4$ or $Co/Co^{2+}$ reaction, i.e. the metal cobalt powder dissolving process. When the $Co(OH)_4^{2-}$ dicobaltite concentration reaches a saturated condition in the alkaline electrolyte, the $Co(OH)_4^{2-}$ dicobaltite starts to transfer into the CoOOH compound. The metal cobalt powder dissolves quickly at higher temperature. The $Co(OH)_4^{2-}$ dicobaltite concentration is higher at higher temperature. The reaction potential of $Co(OH)_4^{2-}$ dicobaltite transfer to CoOOH or $Co^{2+}/Co^{3+}$ occurs in a range 0.1V~0.5V vs. Hg/HgO. The $Co^{2+}/Co^{3+}$ reaction is also fast at higher temperature. Generally, the metal cobalt powder easily transfers into CoOOH compound at higher temperature. At higher temperature, the formation charge of dissolved dicobaltite transfers into a fine and uniform network of CoOOH compound, which shows a good conductivity on the surface of the nickel hydroxide particles.

The particle size of metal cobalt powder in the pasted nickel hydroxide may have a mean particle diameter, for example, in a range of 0.1 μm to 5 μm, and preferably less than 1 μm. The metal cobalt powder used in various embodiments provided herein has the solubility in the electrolytic solution higher than the solubility of the cobalt compound, such as cobalt hydroxide and cobalt monoxide. The metal cobalt powder having a higher solubility can be completely transformed into the CoOOH compound at the first formation charge. It can be more easily transformed into CoOOH if the first formation charge is performed at a higher temperature.

The reaction potentials for $Co/Co^{2+}$ and $Co^{2+}/Co^{3+}$ reactions relate to the environmental temperatures. The reaction potential decreases with increasing the temperature. The formation charge of the pasted nickel hydroxide electrode involves the transformation of metal cobalt powder into the CoOOH compound. The CoOOH compound is connecting to the surface of the nickel hydroxide particle to become a conductive network. The metal cobalt powder, in some embodiments is completely transformed into CoOOH compound at the first charge. Without complete transformation to CoOOH, the excess of cobalt powder will change into cobalt compound particles and these cobalt compound particles may block the pores of CoOOH conductive network at the surface of the nickel hydroxide particles. During operation of the cell, the pores of CoOOH conductive network influence the hydrogen adsorption and absorption capabilities of the nickel hydroxide particles, and should preferably remain unblocked.

In the pasted nickel hydroxide electrode, metal cobalt powder dissolves to form the CoOOH conductive network at the surface of the positive electrode active materials, which contains nickel hydroxide particles. The added metal cobalt powder should first transfer into the CoOOH compound before the $Ni(OH)_2/NiOOH$ or $Ni^{2+}/Ni^{3+}$ reactions start. Thus the metal cobalt powder is more easily transforming into CoOOH compound at high-temperature charge formation in comparison with the nickel hydroxide transferring to nickel oxyhydroxide at the high temperature charge. After the metal cobalt powder totally transfers into CoOOH compound and CoOOH forms the conductive network at the surface of the nickel hydroxide particle, the active nickel hydroxide powder reaches a high charge acceptance and high capacity utilization form.

Figure 6:
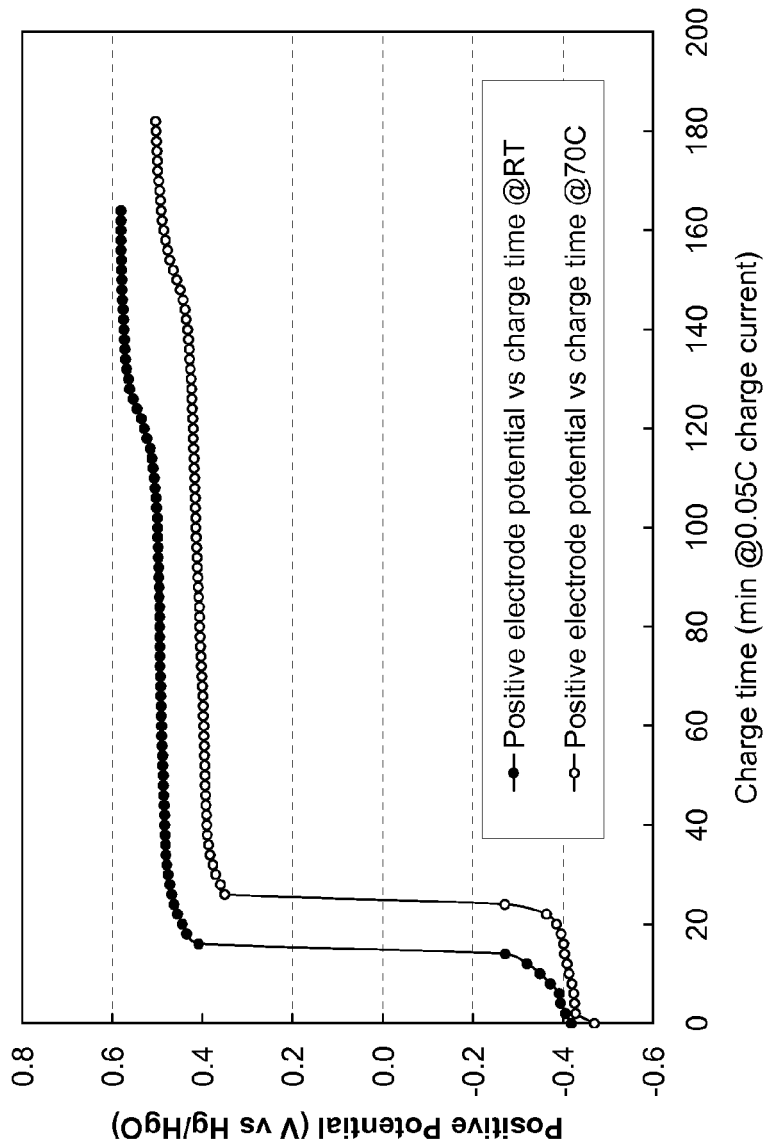
FIG. 6 is a plot of a positive electrode potential as a function of charge time at room temperature and at 70° C. and at the charge current of 0.05 C.

The environmental temperature during the formation charge affects the $Co/Co^{2+}$ and $Co^{2+}/Co^{3+}$ reaction rates. It is suggested that the $Co/Co^{2+}$ and $Co^{2+}/Co^{3+}$ reactions are favored at higher temperatures. FIG. 6 shows the pasted nickel hydroxide electrode potential as a function of charge time at 0.05 C charge current. The nickel hydroxide electrode is composed of 10 wt. % Ni210 powder, 4 wt. % Co powder, 0.3 wt. % carboxymethyl cellulose (CMC) with the balance being surface-modified nickel hydroxide powder. The substrate of the pasted nickel electrode used is the 350 $g/m^2$ nickel foam. The counter electrode is the pasted zinc electrode. The formation charges were conducted at room temperature and at 70° C. It can be seen that the potential is generally lower when charge formation is conducted at 70° C. The potential has two plateaus, which show the $Co/Co^{2+}$ and $Co^{2+}/Co^{3+}$ reactions. At the second potential plateau, the cobalt reaction comprises both $Co/Co^{2+}$ and $Co^{2+}/Co^{3+}$ reactions. The metal cobalt powder preferably should completely be transformed into the CoOOH compound before the $Ni^{2+}/Ni^{3+}$ reaction happens. The higher concentration of the dissolved $Co(OH)_4^{2-}$ dicobaltite results in the uniform distribution of fine CoOOH particles at the surface of the nickel hydroxide particles. The fine CoOOH particles form a conductive network at the surface of the nickel hydroxide.

Figure 7:
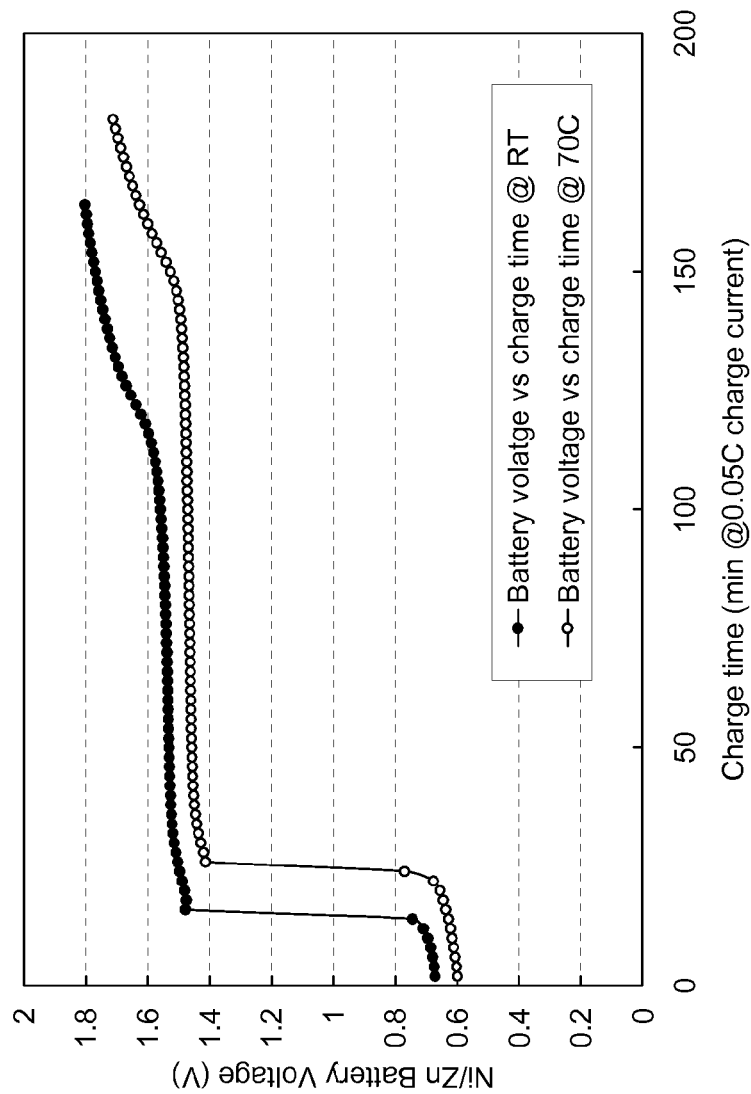
FIG. 7 is a plot illustrating the charge voltage of Ni/Zn battery as a function of charge time at room temperature and at 70° C. at the charge current of 0.05 C.

The charge voltage of the Ni/Zn battery at room temperature and at 70° C. as a function of the charge time is shown in FIG. 7. The charge voltage curves of the Ni/Zn batteries have a same trend as the potential of the pasted nickel hydroxide electrode. The two steps of the charge voltage also reflect the $Co/Co^{2+}$ and $Co^{2+}/Co^{3+}$ transformation reactions. The amount of metal cobalt powder transferring into the CoOOH compound plays important role on the capacity utilization of the nickel hydroxide particles and high-rate charge/discharge capabilities of the pasted nickel hydroxide electrode. The used charge current is 0.05 C. The nominal capacity of the Ni/Zn cell is designed to be 2 Ah. The charge current for the $Co/Co^{3+}$ formation is 100 mA. The amount of metal cobalt powder in the pasted nickel hydroxide electrode is 4 wt. %. The $Co/Co^{3+}$ reaction formation lasted about 2.1 hrs at room temperature. However, The $Co/Co^{3+}$ reaction formation lasted about 2.7 hrs at 70° C. It is clearly shown that the metal cobalt powder efficiently transfers into the CoOOH compound at 70° C.

In the alkaline storage battery, the positive nickel hydroxide electrode plate contains cobalt powder or cobalt compounds that have different solubility in an electrolytic solution. The surface-modification of nickel hydroxide particles leads to a decrease in the solubility of cobalt powder or cobalt compound of the pasted nickel hydroxide electrode in an alkaline electrolytic solution. The low solubility of cobalt powder in the pasted nickel hydroxide electrode leads to a highly conductive tight CoOOH network during the first formation charge of the battery. Therefore, the denser conductive CoOOH network provides the structure stability and results in decreased swelling of the positive nickel hydroxide electrode. Furthermore, in the alkaline storage battery described herein, the formation of the denser conductive CoOOH network utilizes slow solubility of cobalt powder during the charge formation. The denser CoOOH conductive network also provides a high-rate charge and discharge capability of the pasted nickel hydroxide electrode. After the higher temperature charge formation of the pasted nickel electrode, the nickel hydroxide particle is typically completely covered by the fine and dense conductive CoOOH network. The cobalt powder can, in some embodiments, completely transfer into the conductive CoOOH network during the first formation charge at higher temperature and the conductive CoOOH network is substantially formed inside the nickel hydroxide electrode plate. However, at the lower temperature formation, the cobalt powder, in some embodiments, may not completely transfer into the conductive CoOOH network at the first charge of the pasted nickel hydroxide electrode plate. The residual cobalt powder in some embodiments cannot completely form the CoOOH network inside the nickel hydroxide electrode plate with a denser conductive CoOOH network. Thus the residual cobalt particles could block the pores of the conductive CoOOH network and lead to a decrease in the high-rate charge/discharge capabilities of the pasted nickel hydroxide electrode. However, both room temperature charge formation, and elevated temperature charge formation are within the scope of embodiments provided herein.

The conductive network of CoOOH compound at the surface of the nickel hydroxide particle forms at the charge formation of the pasted nickel electrode. The CoOOH formation occurs at a potential that is less than the $Ni(OH)_2/NiOOH$ potential. The CoOOH network uniformly coating the surface of nickel hydroxide particles also results in a high charge acceptance and high-rate charge capability of the pasted nickel electrode.

Addition of a Complexing Agent in the Pasted Nickel Hydroxide Electrode

The role of a complexing agent in a cobalt-containing positive nickel electrode, using NaDDC as an example, will be discussed. While not wishing to be bound by the described mechanism of action, it is believed that the complexing agent stabilizes the cobalt-containing network in the positive nickel electrode.

The metal cobalt powder and cobalt compounds are used as the conductive matrix in the pasted nickel hydroxide electrode. The metal cobalt powder and cobalt compounds during the charge formation of the nickel hydroxide transfer into the conductive CoOOH network, which acts as the conductive current collector between the nickel hydroxide particles. The CoOOH network could be deteriorated during the overdischarge or long-time storage of the battery. Thus, the stabilization of the CoOOH network is expected to result in high capacity utilization, high-rate charge/discharge capability and long cycling lifetime of the pasted nickel hydroxide electrode.

NaDDC is an inhibitor capable of forming a metal complex at the surface of the metal or alloy. The metal-DDC complexes are very stable as passivation compounds. Cobalt can form low-coordinate $Co^{2+}$ complexes with sodium diethyldithiocarbamate. The $Co(DDC)_2$ passivation complex is stable in the alkaline electrolytic solution. Thus the $Co(DDC)_2$ complex inhibits the metal cobalt powder from being dissolved in the pasted nickel hydroxide after soaking in the alkaline electrolytic solution. The $Co(DDC)_2$ particles uniformly distributing into the CoOOH network enhance the hydrogen diffusion reaction at the surface of nickel hydroxide, i.e. $Co(DDC)_2$ particles promote the $Ni^{2+}/Ni^{3+}$ reaction.

Figure 8:
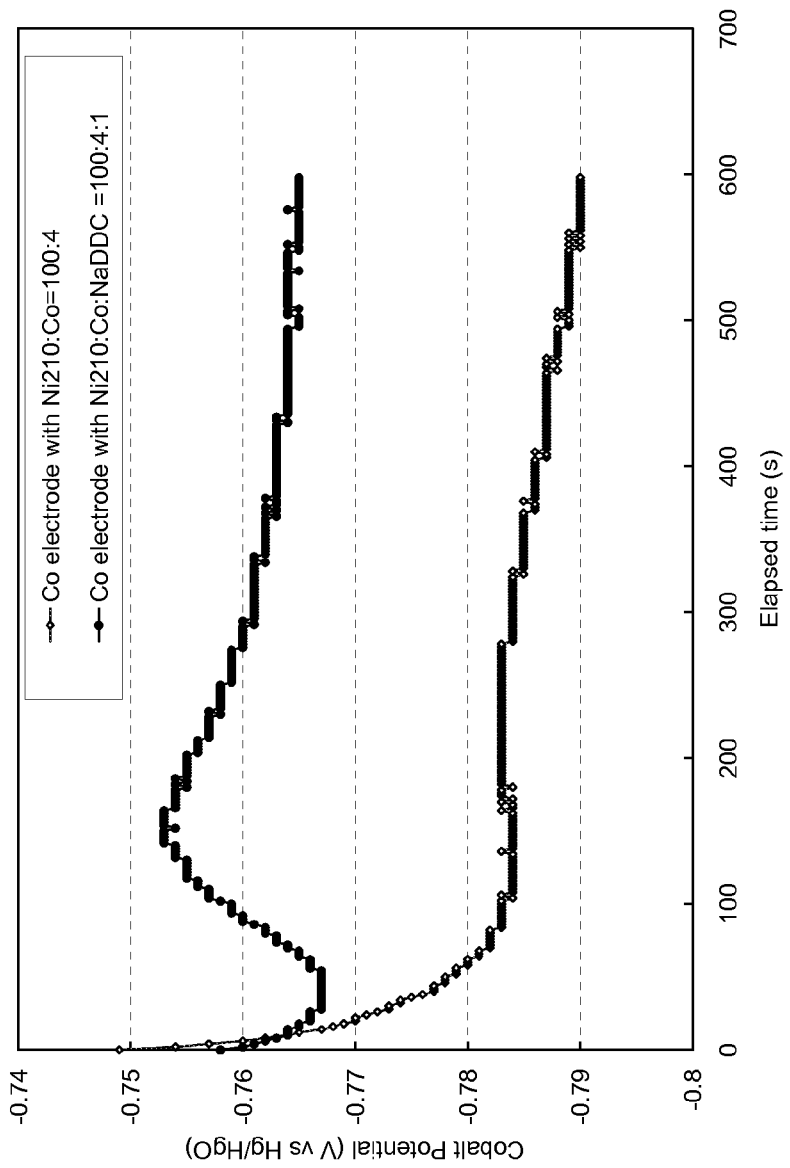
FIG. 8 illustrates open circuit potential of an electrode plate with and without NaDDC additive in 30% KOH electrolytic solution as function of elapsed time

The NaDDC addition in the pasted nickel electrode raises the positive electrode potential. The NaDDC addition can elevate the cobalt dissolution potential for $Co/Co^{2+}$ reaction by about 25 mV. FIG. 8 shows the cobalt electrode open circuit potential as a function of elapsed time. The cobalt electrode plate is made from a mixture with the following proportions of components: Ni210 powder:Co powder:CMC (100:4:0.3). The NaDDC-containing cobalt electrode is made from a mixture with Ni210 powder:Co powder:NaDDC: CMC in the following proportion: 100:4:1:0.3. The alkaline electrolyte was 30% KOH aqueous solution. The open circuit potential of cobalt electrode with the NaDDC additive is higher than in the absence of this additive. The open circuit potential of NaDDC-containing cobalt electrode is 25 mV higher than that of the cobalt electrode that does not contain NaDDC. It is shown that the NaDDC addition to the cobalt electrode shifts the cobalt electrode potential to higher value. The higher open circuit potential of NaDDC-containing cobalt electrode suggests that the NaDDC acts as the cobalt corrosion inhibitor and prevents the metal cobalt powder to be dissolved in the alkaline electrolytic solution.

In addition it was shown that the pasted nickel hydroxide electrode with added NaDDC has a low cobalt solubility in the alkaline electrolytic solution during long "soak" time of the electrode in the electrolyte. At the same time, the pasted nickel hydroxide electrode with NaDDC additive shows a very fast $Co/Co^{3+}$ reaction during the formation charge of the electrode.

Dissolution of the NaDDC-free cobalt electrode can be visually observed by the color changes of an alkaline solution into which the cobalt electrode is immersed. Two cobalt electrodes, one with the NaDDC additive and one without the NaDDC additive were immersed into 30% KOH electrolytic solution for 7 days in separate bottles. The cobalt electrode plate was made from a mixture of Ni210 powder, metal Co powder and CMC at a weight ratio of 100:4:0.3 respectively. The NaDDC-containing cobalt electrode was made from a mixture containing Ni210 powder, metal Co powder, NaDDC and CMC at a weight ratio of 100:4:1:0.3 respectively. The weight of Co electrode plate was 2 g and the weight of 30% KOH electrolytic solution was 20 g. The electrodes were immersed in alkaline solution and were photographed after 7 days of standing. Significant color change was observed in the alkaline solution into which the NaDDC-free cobalt electrode was immersed, whereas the solution into which the NaDDC-containing electrode was immersed, remained essentially colorless. The color change of the KOH solution reflects that the metal cobalt powder dissolves into the KOH electrolytic solution and is then re-precipitated as a cobalt compound complex, such as $HCoO_2$, $Co_2O_3$ etc., when the NaDDC-free electrode is used. It was clearly shown that the NaDDC addition can prevent the metal cobalt powder from dissolving into the KOH electrolytic solution. Part of metal cobalt powder reacts with the NaDDC to form stable $Co(DDC)_2$ passivation particles, which prevent the metal cobalt powder from further dissolution into the KOH solution. It was also shown that the cobalt electrode with cobalt and NaDDC ratio of 4:1 exhibits no visible cobalt dissolution during long "soak" time of the cobalt-NaDDC electrode in the alkaline electrolyte, i.e. no visual color change during long "soak" time of the Co—NaDDC electrode in the 30% KOH solution was observed.

Figure 9:
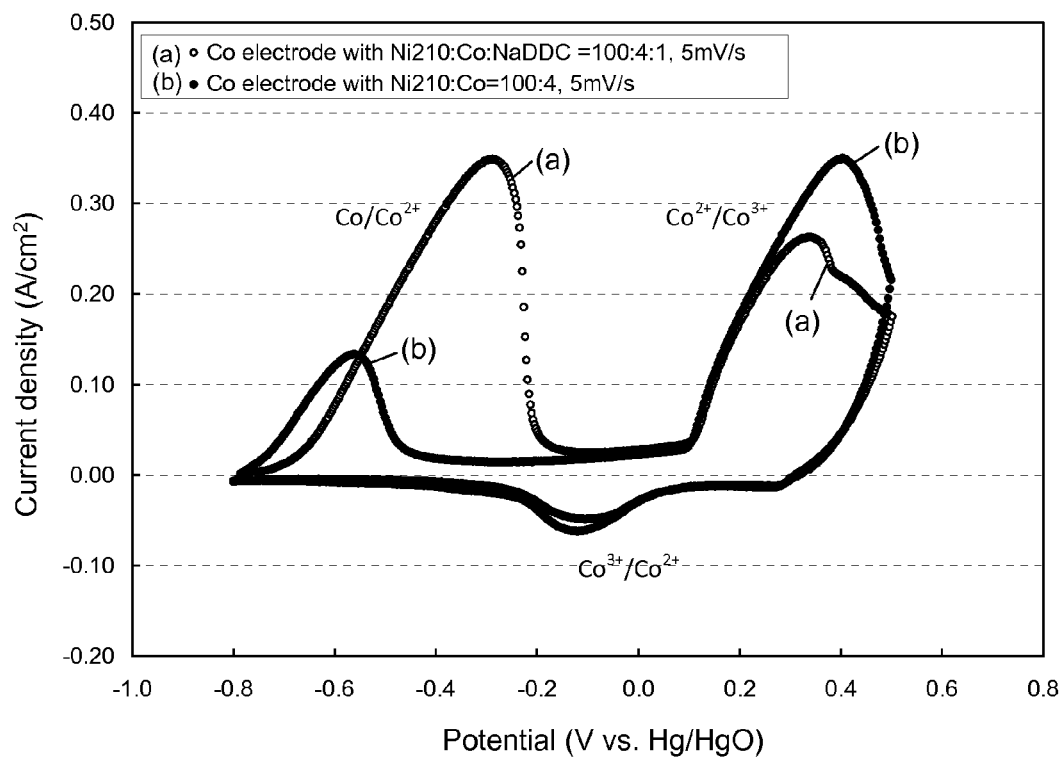
FIG. 9 illustrates CV curves for the positive electrode with and without NaDDC additive in the 30% KOH electrolytic solution (scan rate: 5 mV/s).

FIG. 9 shows the CV curves of cobalt electrode with and without NaDDC addition in the Co electrode plate (at a scan rate: 5 mV/s). The electrolyte was 30% KOH solution The cobalt electrode plate was made of a mixture with Ni210 powder:Co powder:CMC=100:4:0.3 in weight ratio. The NaDDC-containing cobalt electrode was made from a mixture with Ni210 powder:Co powder:NaDDC:CMC=100:4:1: 0.3 in weight ratio. The NaDDC-containing cobalt electrode has a fast $Co/Co^{2+}$ reaction when the applied potential reaches −0.4V vs Hg/HgO. The polarization current at $Co/Co^{2+}$ reaction refers to both $Co/Co(DDC)_2$ reaction and to $Co/K_2Co(OH)_4$ reaction. The metal cobalt powder partially transfers into the stable $Co(DDC)_2$ particles and other metal cobalt powder dissolves into the electrolytic solution to form the $Co(OH)_4^{2-}$ dicobaltite. The $Co^{2+}/Co^{3+}$ reaction reflects that the dissolved $Co(OH)_4^{2-}$ dicobaltite transforms into the CoOOH compound. The stable $Co(DDC)_2$ particles uniformly distribute into the CoOOH network and the $Co(DDC)_2$ particles do not transform into the CoOOH compound. It is clearly shown that the NaDDC addition in the Co electrode can be used to accelerate the metal Co powder dissolubility in the alkaline electrolytic solution during formation charge of the Co electrode. Thus the addition of NaDDC in the pasted nickel hydroxide electrode will aid an acceleration of the charge formation in a pasted nickel hydroxide electrode and will also assist in acceleration of formation of a uniform CoOOH network at the surface of the nickel hydroxide particles.

In some embodiments, in the pasted nickel type electrode for an alkaline storage battery, a speed at which the cobalt metal powder dissolves into the alkaline electrolyte solution and deposits as mentioned above is so fast that when the charge formation is carried out under high temperature conditions, such as at 70° C., the conductive network of cobalt oxyhydroxide compound can quickly deposit on the surface of the active nickel hydroxide particles. The CoOOH compound uniformly segregating onto the surface of the active material particles plays an important role on the capacity utilization and high-rate charge/discharge capabilities. However, a part of the cobalt oxyhydroxide diffusing into the pores of spherical nickel hydroxide particles and the dense CoOOH compound in the pore of spherical nickel hydroxide particles may block the hydrogen diffusion reaction through the surface of the nickel hydroxide particles, thereby gradually reducing the activity of nickel hydroxide electrode reaction ($Ni^{2+}/Ni^{3+}$) for an alkaline storage battery. As a result, a charge/discharge cycle performance under high-rate charge/discharge conditions can be degraded.

In the pasted nickel hydroxide electrode, the metal cobalt powder or cobalt compounds act as the conductive agent during charge formation as network of CoOOH compound is formed. The high amount of metal cobalt powder or cobalt compounds in the pasted nickel hydroxide electrode lead to an improvement in the battery long cycle lifetime and long-cycling durability. However, the high cobalt amount in the pasted nickel hydroxide electrode results in a thick layer CoOOH conductive network, which leads to a resistance on the hydrogen penetration through the CoOOH compound layer into the nickel hydroxide particles. Thus the high cobalt amount in the nickel electrode results in the degradation of the high-rate charge/discharge capabilities. Generally, the cobalt atoms at the surface of the nickel hydroxide particles slowly mix with the lattice nickel atoms of nickel hydroxide particle through cobalt element penetration into the lattice of the nickel hydroxide particles with increasing the number of charge and discharge cycles. The decrease in the cobalt layer at the surface of the nickel hydroxide particles with increasing the number of charge and discharge cycles leads to deterioration of the battery cycling capacity, especially at higher temperatures. Thus, the amount of metal cobalt powder or cobalt compounds in the pasted nickel hydroxide electrode plays very important role on the battery long cycle lifetime and high-rate charge/discharge capabilities. The addition of NaDDC in the pasted nickel hydroxide electrode leads to production of a $Co(DDC)_2$ particles in the CoOOH network. The $Co(DDC)_2$ particles are believed to promote the hydrogen diffusion through the CoOOH layer at the surface of the nickel hydroxide particles into the lattice of nickel hydroxide particles. The $Co(DDC)_2$ particles also act as the hydrogen penetration activator in the pasted nickel hydroxide. The accelerated reaction of the hydrogen with nickel hydroxide particles results in a high-rate charge/discharge capabilities and a decrease in the polarization resistance. The NaDDC addition in the pasted nickel hydroxide electrode, together with a high amount of metal cobalt powder or cobalt compounds, leads to an improvement of the long cycling durability and high-rate charge/discharge capabilities of the alkaline storage batteries.

The hydrogen diffusion reaction in the nickel hydroxide particles dominates the high-rate charge/discharge capabilities, i.e. the rate-determining reaction of the pasted nickel hydroxide electrode is the hydrogen diffusion reaction in the nickel hydroxide particles. Generally, the small nickel hydroxide particles benefit the high-rate charge/discharge performances. The charge and discharge of nickel hydroxide particles relating to the hydrogen diffusion in the nickel hydroxide particles can be expressed as follows:

(charge transfer reaction)

(Hydrogen diffusion reaction or mass transfer reaction)

The adsorbed hydrogen diffusion from the surface of NiOOH particles into the interior of the NiOOH particles reflects the rate-determining process during the discharge of nickel hydroxide electrode. Reversibly, the absorbed hydrogen diffusion from the interior of $Ni(OH)_2$ particles into the surface of the $Ni(OH)_2$ particles as the adsorbed hydrogen also reflects the rate-determining process during the charge of nickel hydroxide electrode. The charge transfer reactions of the nickel hydroxide electrode reflect that hydrogen transfers between the adsorbed hydrogen atoms and the absorbed hydrogen atoms. The $Co(DDC)_2$ particles at the surface of the nickel hydroxide particles enhance the reaction of the hydrogen at the surface of nickel hydroxide particles and reaction with $OH^-$. Furthermore, the existence of the $Co(DDC)_2$ particles at the surface of the nickel hydroxide particles promotes the charge transfer reaction of hydrogen at the surface of the nickel hydroxide particles. Thus the $Co(DDC)_2$ particles in the surface layer of the nickel hydroxide particles lead to a decrease in the nickel electrode polarization resistance.

The cobalt oxyhydroxide compound plays an important role as the conductive network and current collector at the surface of the nickel hydroxide particles. Thus the crystal structure and crystallite particle size of the CoOOH compound are significant for the high-rate charge and discharge performances of the pasted nickel hydroxide electrode. The fine CoOOH particles and less dense CoOOH crystallites at the surface of the nickel hydroxide particles benefit the high-rate charge and discharge capability of the pasted nickel hydroxide electrode. Generally, the CoOOH compound layer at the surface of the nickel hydroxide particles should form good conductive network as the current collector and CoOOH particles should have such a distribution as to allow for a quick hydrogen penetration through the CoOOH layer. The thick CoOOH layer at the surface of the nickel hydroxide particles can affect hydrogen diffusion through the nickel hydroxide particles.

EXPERIMENTAL EXAMPLES

Example 1

Figure 10:
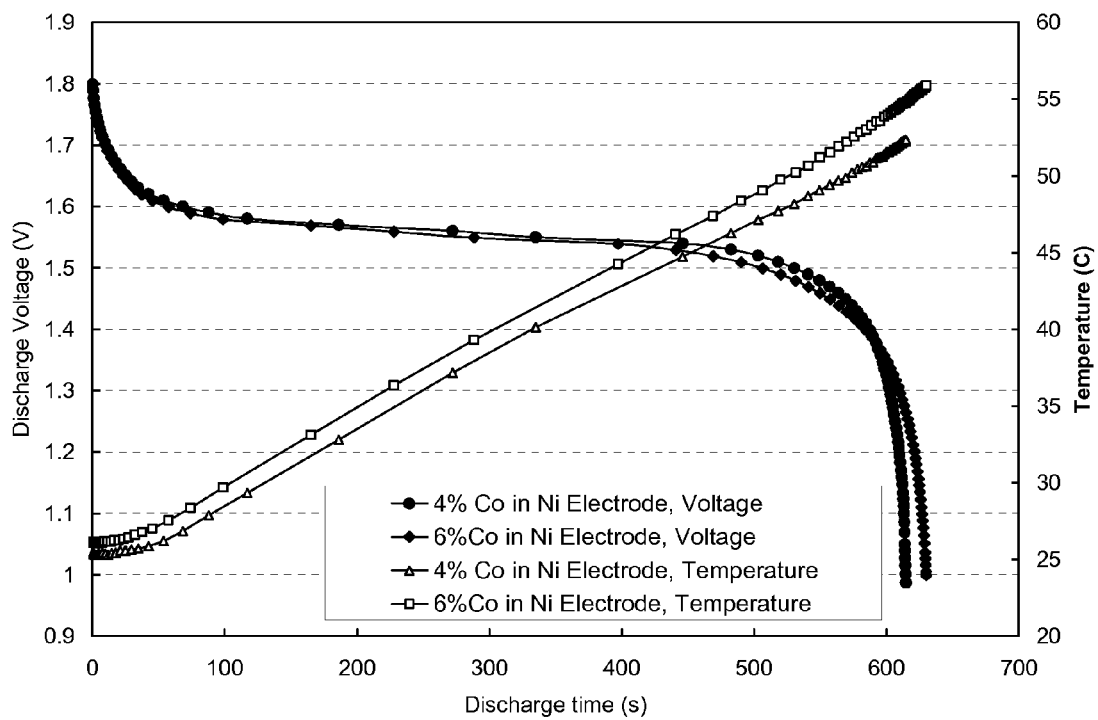
FIG. 10 illustrates discharge curves of the Ni/Zn batteries using the nickel hydroxide electrode with 4 wt. % and 6 wt. % metal Co powder additives (discharge current: 12 A)

FIG. 10 shows the discharge curves of the Ni/Zn batteries using the nickel hydroxide electrode prepared using surface-oxidized nickel hydroxide particles with 4 wt. % and 6 wt. % metal Co powder additives at 12 A discharge current. The greater amount of added cobalt in the pasted nickel hydroxide electrode leads to an increase in the capacity utilization of the nickel hydroxide particles. However, the large amount of added cobalt powder in the pasted nickel hydroxide electrode leads to a decrease in the discharge voltage of the Ni/Zn battery and to an increase in the battery temperature. Because the rechargeable alkaline batteries particularly for the HEV applications need high-rate charge and discharge capabilities, long cycle lifetime and higher temperature conditions, the nickel hydroxide electrode would benefit from a high amount of added cobalt metal.

Example 2

Figure 11:
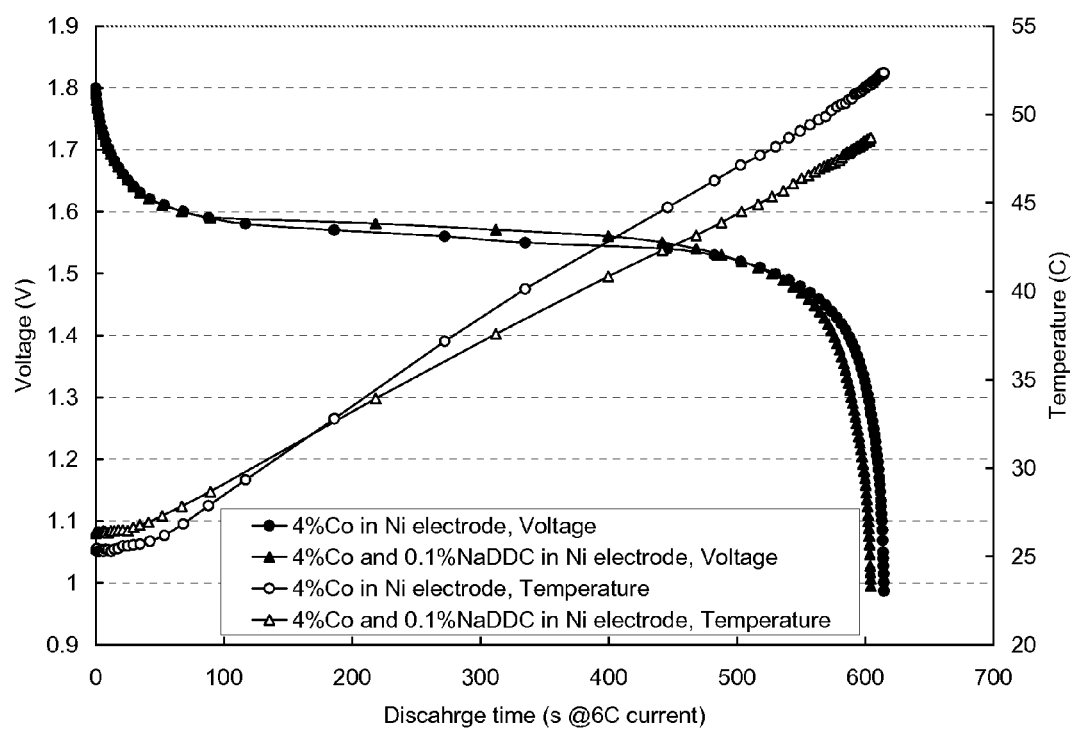
FIG. 11 illustrates discharge voltage and temperature of the Ni/Zn batteries as a function of discharge time at 6 C discharge current (discharge current: 12 A).

FIG. 11 shows the discharge voltage and temperature of a Ni—Zn cell as a function of discharge time at 6 C discharge current (discharge current: 12 A) for cells having nickel positive electrode prepared with and without NaDDC addition. The cobalt amount in the pasted nickel hydroxide was 4% by weight. The electrode was prepared using surface-oxidized nickel hydroxide particles. The amount of added NaDDC in the pasted nickel hydroxide electrode was 0.1% by weight. The increased temperature of the battery with the NaDDC-free nickel hydroxide electrode during the discharge process was 27.0° C. The increased temperature of the battery with the 0.1 wt. % NaDDC additive in nickel hydroxide electrode during the discharge process was significantly smaller— 22.2° C. The increase in the battery temperature using the NaDDC-containing nickel hydroxide electrode was about 4.8° C. less than that the increase in the battery using the regular nickel hydroxide electrode. The higher temperature increase for the battery with the NaDDC-free nickel hydroxide electrode reflects that the CoOOH at the surface of the nickel hydroxide particles acts both as the conductive network and also as a block of the hydrogen diffusion reaction with the nickel hydroxide particles. Addition of NaDDC to the nickel hydroxide electrode is believed to speed up the reaction of the hydrogen with the nickel hydroxide particles.

Figure 12:
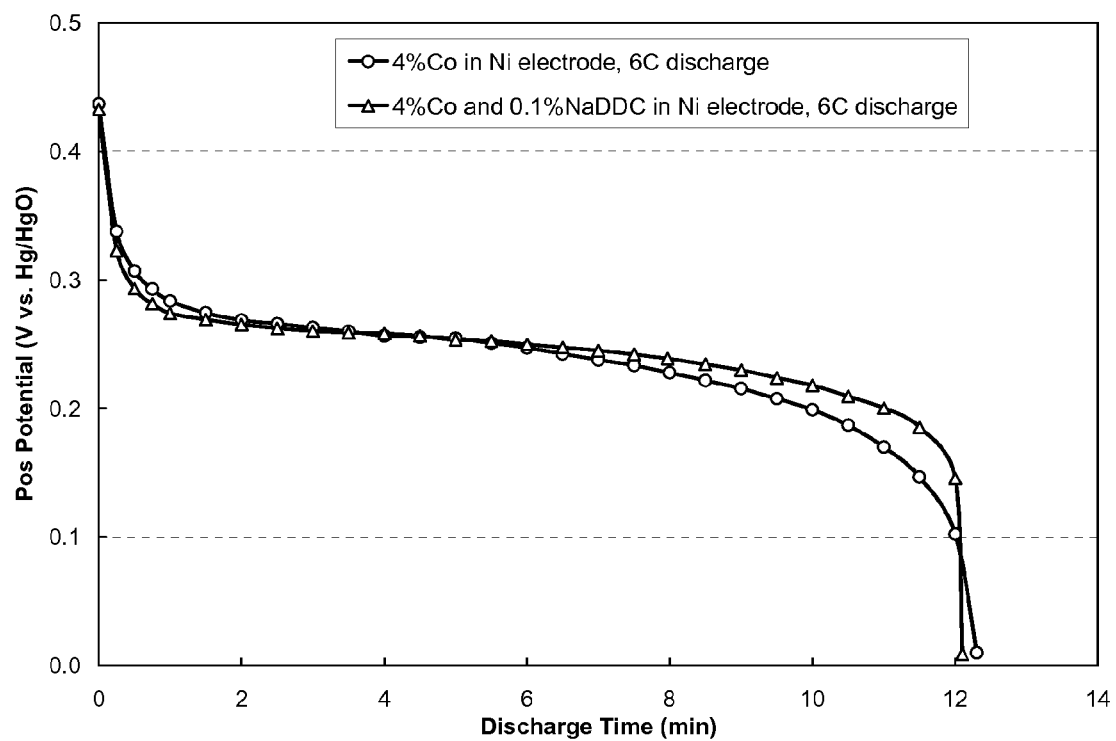
FIG. 12 illustrates discharge potential of the positive electrode as a function of the discharge time. The discharge current is 6 C, i.e. 12 A

FIG. 12 shows the discharge potential of the positive electrode as a function of the discharge time for a NaDDC-free positive nickel electrode and NaDDC-containing positive nickel electrode, prepared using surface-oxidized nickel hydroxide particles, and both having 4% by weight of added cobalt metal. The discharge current was 6 C, i.e. 12 A. The positive electrode potential was recorded at room temperature. The reference electrode was the Hg/HgO electrode. It is shown that the discharge potential curve of the nickel electrode having NaDDC additive has an advantageously flat discharge potential region. Especially, the discharge potential is higher in the NaDDC-containing electrode in comparison to the NaDDC-free electrode close to the end of the discharge process. This means that the NaDDC addition in the pasted nickel hydroxide electrode improves the high-rate charge/discharge capabilities. It is believed that the surface of the nickel hydroxide particles contain a plurality of micro-pores, which provide high specific surface area beneficial for the high-rate charge/discharge reactions. The reactions refer to hydrogen absorption into the interior of the nickel hydroxide particles and the external portion of the nickel hydroxide particles. The amount of metal cobalt powder and cobalt compounds in the pasted nickel hydroxide electrode forms the layer of cobalt oxyhydroxide compound, which can potentially block the hydrogen diffusion into the interior or external portions of the hydroxide particles. The high content of the cobalt compounds causes the higher polarization resistance of the pasted nickel hydroxide electrode. Without wishing to be bound by this mechanism of action, it is believed that the NaDDC addition in the pasted nickel hydroxide provides the micropores at the surface of CoOOH layer of nickel hydroxide particles that promote the hydrogen reactions with the nickel hydroxide particles.

Example 3

Figure 13:
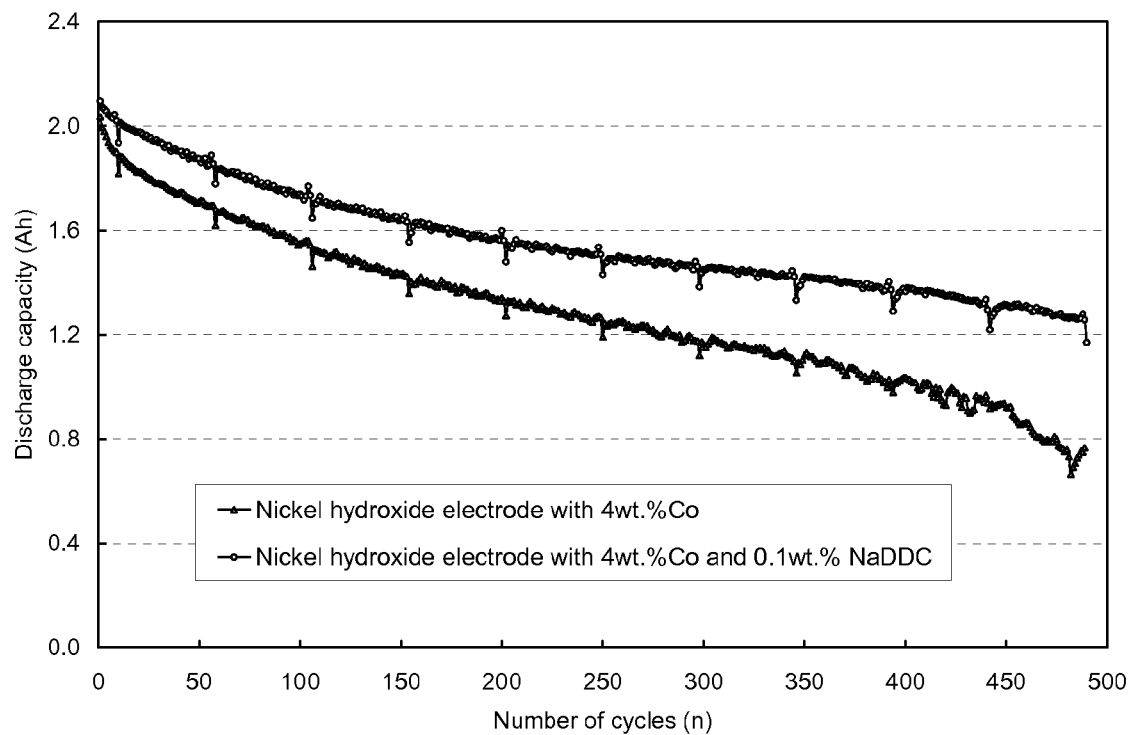
FIG. 13 illustrates discharge capacity of the Ni/Zn cells as a function of number of cycles.

FIG. 13 illustrates discharge capacity of the Ni/Zn cells as a function of number of cycles. The Ni/Zn batteries were built by using the surface-oxidized nickel hydroxide with the addition of 4 wt. % Co and 0.1 wt. % NaDDC (or without addition of NaDDC in a control experiment). The batteries were cycled at a charge regime with 2 A constant current charge to 1.90 V and constant voltage charge to 90 mA end-of-charge current. The discharge current was 10 A. The temporary capacity dips appearing in the cycling curves correspond to 20 A discharge cycles followed by 24 hours rest at the $10^{th}$ cycle and then resuming continuous cycling but resting at every $50^{th}$ cycle. It is shown in FIG. 13 that the discharge capacity of the Ni/Zn battery having a NaDDC-containing nickel hydroxide electrode has a slow fading on the increase in the number of cycles. It is believed that the NaDDC addition in the pasted nickel hydroxide electrode leads to an efficient formation of CoOOH conductive network and an improvement in the charge/discharge efficiencies of the pasted nickel hydroxide electrode.

What is claimed is:

1. A battery cell comprising:
   (a) a negative electrode;
   (b) a nickel hydroxide positive electrode comprising:
      nickel hydroxide particles;
      cobalt metal and/or cobalt compound; and
      a sulfur-containing complexing agent capable of forming a complex with cobalt, wherein the sulfur-containing complexing agent is a dialkyldithiocarbamate;
   (c) a separator disposed between the positive electrode and the negative electrode and preventing electrical contact therebetween; and
   (d) an electrolyte in contact with the negative electrode, the positive electrode and the separator.

2. The battery cell of claim 1, wherein the sulfur-containing complexing agent is sodium diethyldithiocarbamate.

3. The battery cell of claim 1, wherein the positive electrode comprises a pasted portion, and wherein the pasted portion comprises between about 0.02-0.2 weight % of sodium diethyldithiocarbamate.

4. The battery cell of claim 1, wherein the sulfur-containing complexing agent increases the $Co/Co^{2+}$ potential by at least about 20 mV upon binding to cobalt.

5. The battery cell of claim 1, wherein the nickel hydroxide particles have a modified surface wherein nickel on average has a higher oxidation state on the surface of the particles than in the bulk of the particles.

6. The battery cell of claim 1, wherein the nickel hydroxide particles comprise a coating of a cobalt compound.

7. The battery cell of claim 1, wherein after formation, the positive electrode comprises CoOOH.

8. The battery cell of claim 1, wherein after formation, the positive electrode comprises substantially no cobalt metal.

9. The battery cell of claim 1, wherein the negative electrode is a zinc oxide negative electrode.

10. The battery cell of claim 9, wherein the zinc oxide negative electrode comprises no more than about 10 ppm cobalt.

11. The battery cell of claim 1, wherein the nickel hydroxide positive electrode further comprises nickel metal powder, $Y_2O_3$, $Ca(OH)_2$, and a binder.

12. The battery cell of claim 1, wherein the cobalt compound in the nickel hydroxide positive electrode is not soluble in the electrolyte at room temperature, and wherein the electrolyte is an alkaline electrolyte.

13. The battery cell of claim 1, wherein the positive electrode comprises between about 2-10 weight % of cobalt metal and/or cobalt compound.

14. The battery cell of claim 1, wherein the battery cell is rechargeable.

15. A nickel hydroxide positive electrode for a battery cell, comprising:
   (a) nickel hydroxide particles;
   (b) cobalt metal and/or cobalt compound; and
   (c) a sulfur-containing complexing agent capable of forming a complex with cobalt, wherein the sulfur-containing complexing agent is a dialkyldithiocarbamate.

16. The nickel hydroxide positive electrode of claim 15, wherein the dialkyldithiocarbamate is sodium diethyldithiocarbamate.

17. A method of making a positive electrode for a battery, comprising:
   (a) forming an electrode mixture comprising nickel hydroxide particles, cobalt metal and/or cobalt compound; and a sulfur-containing complexing agent capable of forming a complex with cobalt, wherein the sulfur-containing complexing agent is a dialkyldithiocarbamate; and
   (b) incorporating the electrode mixture into a positive electrode.

18. The method of claim 17, wherein (a) comprises providing nickel hydroxide particles having a cobalt coating, and oxidizing at least the cobalt coating with an oxidizing agent.

19. The method of claim 17, further comprising forming the positive electrode at a temperature that is greater than 25° C.

20. The method of claim 17, further comprising forming the positive electrode at a temperature of between about 50-70° C.

21. The method of claim 17, wherein the dialkyldithiocarbamate is sodium diethyldithiocarbamate.

* * * * *